US012447755B2

(12) United States Patent
Nakajima et al.

(10) Patent No.: US 12,447,755 B2
(45) Date of Patent: Oct. 21, 2025

(54) THREE-DIMENSIONAL OBJECT PRINTING APPARATUS AND THREE-DIMENSIONAL OBJECT PRINTING METHOD

(71) Applicant: SEIKO EPSON CORPORATION, Tokyo (JP)

(72) Inventors: Yoshinori Nakajima, Matsumoto (JP); Kohei Utsunomiya, Matsumoto (JP); Masaru Kumagai, Shiojiri (JP); Yuki Ishii, Shiojiri (JP)

(73) Assignee: SEIKO EPSON CORPORATION (JP)

(*) Notice: Subject to any disclaimer, the term of this patent is extended or adjusted under 35 U.S.C. 154(b) by 136 days.

(21) Appl. No.: 18/439,878

(22) Filed: Feb. 13, 2024

(65) Prior Publication Data

US 2024/0269992 A1 Aug. 15, 2024

(30) Foreign Application Priority Data

Feb. 14, 2023 (JP) ................................ 2023-020907

(51) Int. Cl.

*B41J 3/407* (2006.01)
*B25J 11/00* (2006.01)
*B41J 25/00* (2006.01)
*B41J 25/316* (2006.01)

(52) U.S. Cl.

CPC ....... *B41J 3/40731* (2020.08); *B25J 11/0075* (2013.01); *B41J 25/001* (2013.01); *B41J 25/316* (2013.01)

(58) Field of Classification Search

CPC ....................................................... B41J 3/407

See application file for complete search history.

(56) References Cited

U.S. PATENT DOCUMENTS

2020/0215834 A1* 7/2020 Bauer .................... B41J 25/006
2022/0032651 A1* 2/2022 Hasegawa ............ B41J 2/04541
2022/0118680 A1 4/2022 Kumagai et al.
2023/0019470 A1* 1/2023 Collins .................... B41J 3/543

FOREIGN PATENT DOCUMENTS

JP 2022-066696 A 5/2022

* cited by examiner

*Primary Examiner* — Scott A Richmond
(74) *Attorney, Agent, or Firm* — Harness, Dickey & Pierce, P.L.C.

(57) ABSTRACT

A three-dimensional object printing apparatus executes a first printing operation in which a liquid is ejected into a first band region and a second printing operation in which the liquid is ejected into a second band region. When an angle formed by a vector at a first position in a first path and a vector at a second position in a second path is set as a first angle and an angle formed by a vector at a third position in the first path and a vector at a fourth position in the second path is set as a second angle, the first angle is more than the second angle, and a width in which the first band region overlaps with the second band region at the first position is less than a width in which the first band region overlaps with the second band region at the third position.

12 Claims, 15 Drawing Sheets

THREE-DIMENSIONAL OBJECT PRINTING APPARATUS AND THREE-DIMENSIONAL OBJECT PRINTING METHOD

The present application is based on, and claims priority from JP Application Serial Number 2023-020907, filed Feb. 14, 2023, the disclosure of which is hereby incorporated by reference herein in its entirety.

BACKGROUND

1. Technical Field

The present disclosure relates to a three-dimensional object printing apparatus and a three-dimensional object printing method.

2. Related Art

In the related art, a three-dimensional object printing apparatus that has a head which ejects a liquid, and performs printing on a surface of a three-dimensional workpiece with an ink jet method by using a robot is known. For example, JP-A-2022-66696 discloses a three-dimensional object printing apparatus that performs printing on a workpiece having a curved surface.

In the technique in the related art described above, when a printing region on the workpiece is divided into a plurality of regions and printed, some of the plurality of divided regions may be overlapped with each other. Meanwhile, an image having a low quality may be formed in the overlapping region.

SUMMARY

According to an aspect of the present disclosure, there is provided a three-dimensional object printing apparatus including: a head having a plurality of nozzles that eject a liquid to a printing region on a workpiece; a movement mechanism that changes a relative position and posture between the workpiece and the head; and a control portion that controls the head and the movement mechanism, in which the control portion executes a first printing operation of ejecting the liquid from the head to the workpiece while changing the relative position between the workpiece and the head through a first path, and a second printing operation of ejecting the liquid from the head to the workpiece while changing the relative position between the workpiece and the head through a second path, the printing region includes a first band region into which the liquid is ejected from the head in the first printing operation, and a second band region into which the liquid is ejected from the head in the second printing operation, and when a width of a region in which a region of the first band region into which the liquid is ejected from the head at a first position in the first path and a region of the second band region into which the liquid is ejected from the head at a second position in the second path overlap with each other is set as a first overlapping width, a width of a region in which a region of the first band region into which the liquid is ejected from the head at a third position in the first path and a region of the second band region into which the liquid is ejected from the head at a fourth position in the second path overlap with each other is set as a second overlapping width, an angle formed by a vector representing a relative movement between the workpiece and the head at the first position and a vector representing the relative movement between the workpiece and the head at the second position is set as a first angle, and an angle formed by a vector representing the relative movement between the workpiece and the head at the third position and a vector representing the relative movement between the workpiece and the head at the fourth position is set as a second angle, the first angle is more than the second angle, and the first overlapping width is less than the second overlapping width.

According to another aspect of the present disclosure, there is provided a three-dimensional object printing method for a three-dimensional object printing apparatus including a head having a plurality of nozzles that eject a liquid to a printing region on a workpiece, and a movement mechanism that changes a relative position and posture between the workpiece and the head, the method including: a first printing operation of ejecting the liquid from the head to the workpiece while changing the relative position between the workpiece and the head through a first path; and a second printing operation of ejecting the liquid from the head to the workpiece while changing the relative position between the workpiece and the head through a second path, in which the printing region includes a first band region into which the liquid is ejected from the head in the first printing operation, and a second band region into which the liquid is ejected from the head in the second printing operation, and when a width of a region in which a region of the first band region into which the liquid is ejected from the head at a first position in the first path and a region of the second band region into which the liquid is ejected from the head at a second position in the second path overlap with each other is set as a first overlapping width, a width of a region in which a region of the first band region into which the liquid is ejected from the head at a third position in the first path and a region of the second band region into which the liquid is ejected from the head at a fourth position in the second path overlap with each other is set as a second overlapping width, an angle formed by a vector representing a relative movement between the workpiece and the head at the first position and a vector representing the relative movement between the workpiece and the head at the second position is set as a first angle, and an angle formed by a vector representing the relative movement between the workpiece and the head at the third position and a vector representing the relative movement between the workpiece and the head at the fourth position is set as a second angle, the first angle is more than the second angle, and the first overlapping width is less than the second overlapping width.

DESCRIPTION OF EMBODIMENTS

Figure 1:
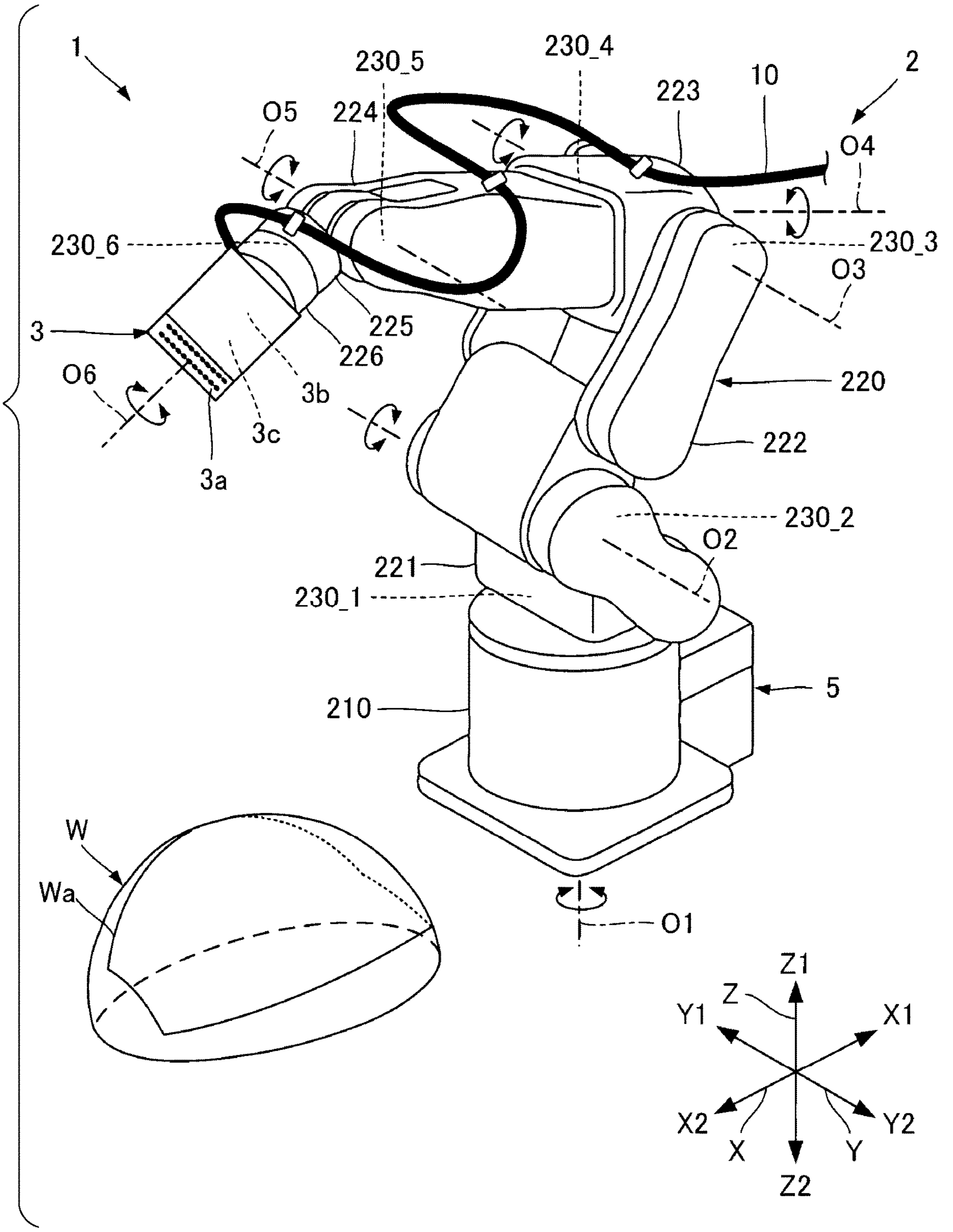
FIG. 1 is a perspective view illustrating an overview of a three-dimensional object printing apparatus according to a first embodiment.

Hereinafter, appropriate embodiments according to the present disclosure will be described with reference to the accompanying drawings. In the drawings, dimensions and scale of each portion are appropriately different from the actual ones, and some portions are schematically illustrated for easy understanding. In addition, the scope of the present disclosure is not limited to the forms unless the present disclosure is particularly limited in the following description.

In the following, for convenience of description, an X-axis, a Y-axis, and a Z-axis that intersect with each other are appropriately used. In the following, one direction along the X-axis is an X1 direction, and a direction opposite to the X1 direction is an X2 direction. In the same manner, directions opposite to each other along the Y-axis are a Y1 direction and a Y2 direction. Further, directions opposite to each other along the Z-axis are a Z1 direction and a Z2 direction.

Here, the X-axis, the Y-axis, and the Z-axis correspond to the coordinate axes of a world coordinate system set in a space in which a robot 2, which will be described below, is installed. Typically, the Z-axis is a vertical axis, and the Z2 direction corresponds to a downward direction in a vertical direction. A base coordinate system based on a position of a base portion 210, which will be described below, of the robot 2 is associated with the world coordinate system by calibration. In the following, for convenience, a case where an operation of the robot 2 is controlled by using the world coordinate system as a robot coordinate system will be illustrated.

The Z-axis may not be the vertical axis. Further, the X-axis, the Y-axis, and the Z-axis are typically orthogonal to each other, but the present disclosure is not limited to this, and the X-axis, the Y-axis, and the Z-axis may not be orthogonal to each other. For example, the X-axis, Y-axis, and Z-axis may intersect with each other at an angle within a range equal to or more than 80° and equal to or less than 100°.

1. First Embodiment

1-1. Overview of Three-dimensional Object Printing Apparatus

FIG. 1 is a perspective view illustrating an overview of a three-dimensional object printing apparatus 1 according to a first embodiment. The three-dimensional object printing apparatus 1 is an apparatus that prints on a printing region Wa which is a part or an entirety of a surface of a three-dimensional workpiece W by an ink jet method.

The workpiece W has a surface including the printing region Wa, which is a range in which an image is formed. In the example illustrated in FIG. 1, the workpiece W is a hemispherical body, and the surface of the workpiece W is a projecting hemispherical surface. For example, the workpiece W at a time of printing is supported by a structure such as a predetermined setting table, a hand of a robot other than the robot 2, which will be described below, or a conveyor, as needed. A size, a shape, or an installation posture of the workpiece W is not limited to the example illustrated in FIG. 1, and is any size, shape, or installation posture. Meanwhile, when the printing region Wa includes a curved surface, effects of the present disclosure, which will be described below, become remarkable. The workpiece W is a certain product, and printing in the printing region Wa is one of a series of steps for manufacturing this product.

As illustrated in FIG. 1, the three-dimensional object printing apparatus 1 includes the robot 2, a head unit 3, a controller 5, and a piping portion 10.

Hereinafter, first, the robot 2, the head unit 3, the controller 5, and the piping portion 10 will be briefly described in order.

The robot 2 is a movement mechanism that changes a position and a posture of the head unit 3 in the world coordinate system. In the example illustrated in FIG. 1, the robot 2 is a so-called 6-axis vertical articulated robot.

As illustrated in FIG. 1, the robot 2 has the base portion 210 and an arm portion 220.

The base portion 210 is a base that supports the arm portion 220. In the example illustrated in FIG. 1, the base portion 210 is fixed to a floor surface facing the Z1 direction or an installation surface such as a base by screwing or the like. The installation surface to which the base portion 210 is fixed may be a surface facing in any direction, is not limited to the example illustrated in FIG. 1, and may be, for example, a surface provided by a wall, a ceiling, a movable trolley, or the like.

The arm portion 220 is a 6-axis robot arm having a base end attached to the base portion 210 and a tip that changes a position and a posture three-dimensionally with respect to the base end. Specifically, the arm portion 220 has arms 221, 222, 223, 224, 225, and 226 also referred to as links, which are coupled in this order.

The arm 221 is rotatably coupled to the base portion 210 around a rotation axis O1 via a joint 230_1. The arm 222 is rotatably coupled to the arm 221 around a rotation axis O2 via a joint 230_2. The arm 223 is rotatably coupled to the arm 222 around a rotation axis O3 via a joint 230_3. The arm 224 is rotatably coupled to the arm 223 around a rotation axis O4 via a joint 230_4. The arm 225 is rotatably coupled to the arm 224 around a rotation axis O5 via a joint 230_5. The arm 226 is rotatably coupled to the arm 225 around a rotation axis O6 via a joint 230_6.

Each of the joints 230_1 to 230_6 is a mechanism for rotatably coupling one of two adjacent members of the base portion 210 and the arms 221 to 226 to the other. In the following, each of the joints 230_1 to 230_6 may be referred to as a "joint 230".

Although not illustrated in FIG. 1, each of the joints 230_1 to 230_6 is provided with a drive mechanism for rotating one of the two adjacent members corresponding to each other to the other. The drive mechanism includes, for example, a motor that generates a drive force for the rotation, a speed reducer that decelerates and outputs the drive force, an encoder such as a rotary encoder that detects the operation amount such as an angle of the rotation, and the like. An aggregation of the drive mechanisms of the joints 230_1 to 230_6 corresponds to an arm drive mechanism 2*a* illustrated in FIG. 2, which will be described below.

The rotation axis O1 is an axis perpendicular to the installation surface, which is not illustrated, to which the base portion 210 is fixed. The rotation axis O2 is an axis perpendicular to the rotation axis O1. The rotation axis O3 is an axis parallel with the rotation axis O2. The rotation axis O4 is an axis perpendicular to the rotation axis O3. The rotation axis O5 is an axis perpendicular to the rotation axis O4. The rotation axis O6 is an axis perpendicular to the rotation axis O5.

Regarding these rotation axes, "perpendicular" includes not only a case where an angle formed by the two rotation axes is strictly 90°, but also a case where the angle formed by the two rotation axes deviates within a range of approximately 90° to ±5°. In the same manner, "parallel" includes not only a case where the two rotation axes are strictly parallel with each other, but also a case where one of the two rotation axes is inclined within a range of approximately ±5° with respect to the other.

The head unit 3 is mounted on the arm 226 located at the most tip among the arms 221 to 226 of the above robot 2, in a state of being fixed by screwing or the like as an end effector.

The head unit 3 is an assembly having a head 3*a* that ejects an ink, which is an example of a "liquid", toward the workpiece W. The surface of the workpiece W is made of, for example, a material that is non-absorbent to inks. The material non-absorbent with respect to inks is a material that does not absorb the inks. For example, the material which is non-absorbent to inks is plastic and inorganic compound such as metals or glass. Meanwhile, the surface of the workpiece W may not be made of a material that is non-absorbent to inks.

In the present embodiment, the head unit 3 also has a pressure regulating valve 3*b* and an energy emitting portion 3*c*. Details of the head unit 3 will be described below with reference to FIG. 3.

The ink is not particularly limited, and includes, for example, an aqueous ink in which a coloring material such as a dye or a pigment is dissolved in an aqueous solvent, a curable ink using a curable resin such as an ultraviolet curable type, a solvent-based ink in which a coloring material such as a dye or a pigment is dissolved in an organic solvent, and the like. Among the inks, the curable ink is preferably used. The curable ink is not particularly limited, and may have, for example, any of a thermosetting type, a photocurable type, a radiation curable type, an electron beam curable type, and the like, and a photocurable type such as an ultraviolet curable type is preferable. The ink is not limited to the solution, and may be an ink in which a coloring material or the like is dispersed as a dispersant in a dispersion medium. Further, the ink is not limited to an ink containing a coloring material, and may be, for example, an ink containing conductive particles such as metal particles for forming wiring or the like as a dispersant, a clear ink, or a treatment liquid for surface treatment of the workpiece W.

Each of the piping portion 10 and a wiring portion, which is not illustrated, is coupled to the head unit 3. The piping portion 10 is a piping or a piping group that supplies the ink from an ink tank, which is not illustrated, to the head unit 3. The wiring portion is a wiring or a wiring group for supplying an electric signal for driving the head 3*a*. The routing of the wiring portion may have the same manner as or different from the routing of the piping portion 10.

The controller 5 is a robot controller that controls the drive of the robot 2. The computer 7 is a computer such as a desktop type or a notebook type in which a program is installed, and controls the drive of the head unit 3. Hereinafter, an electrical configuration of the three-dimensional object printing apparatus 1 will be described with reference to FIG. 2, including a detailed description of the controller 5 and computer 7.

Figure 2:
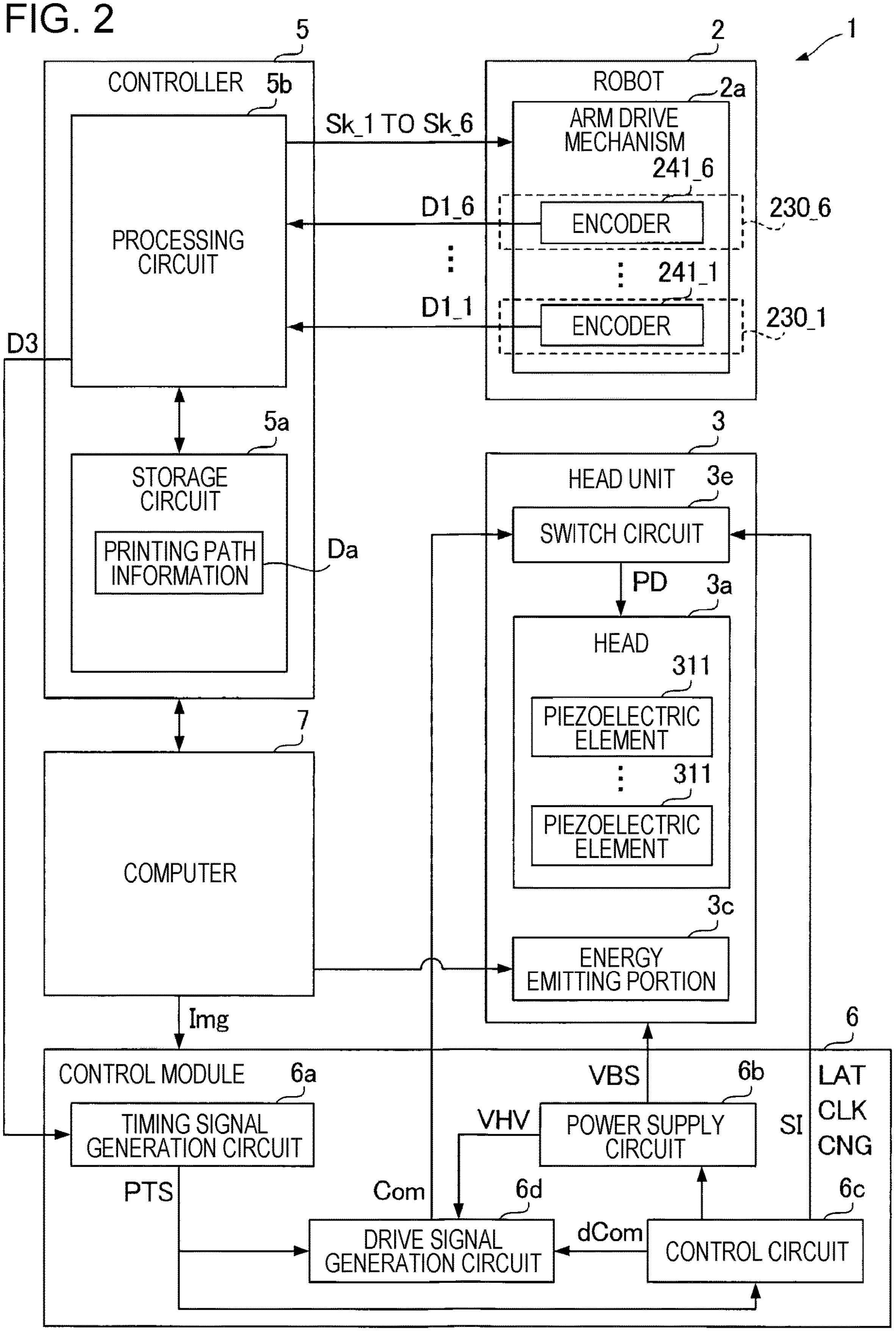
FIG. 2 is a block diagram illustrating an electrical configuration of the three-dimensional object printing apparatus according to the first embodiment.

1-2. Electrical Configuration of Three-dimensional Object Printing Apparatus FIG. 2 is a block diagram illustrating an electrical configuration of the three-dimensional object printing apparatus 1 according to the first embodiment. In FIG. 2, among components of the three-dimensional object printing apparatus 1, electrical components are illustrated. As illustrated in FIG. 2, in addition to the components illustrated in FIG. 1 described above, the three-dimensional object printing apparatus 1 includes a control module 6 that is communicably connected to the controller 5 and a computer 7 that is communicably connected to the controller 5 and the control module 6. The controller 5, the control module 6, and the computer 7 may be collectively referred to as, for example, a "control portion".

Each electrical component illustrated in FIG. 2 may be appropriately divided, a part thereof may be included in another component, or may be integrally formed with the other component. For example, a part or the entirety of the functions of the controller 5 or the control module 6 may be realized by the computer 7, or may be realized by another external apparatus such as a personal computer (PC) coupled to the controller 5 via a network such as a local area network (LAN) or the Internet.

The controller 5 has a function of controlling the drive of the robot 2 and a function of generating a signal D3 for synchronizing an ink ejection operation of the head unit 3 with the operation of the robot 2. The controller 5 has a storage circuit 5*a* and a processing circuit 5*b*.

The storage circuit 5*a* stores various programs to be executed by the processing circuit 5*b* and various types of data to be processed by the processing circuit 5*b*. The storage circuit 5*a* includes, for example, one or both semiconductor memories of a volatile memory such as a random-access memory (RAN) and a non-volatile memory such as a read only memory (ROM), an electrically erasable programmable read-only memory (EEPROM) or a programmable ROM (PROM). A part or all of the storage circuit 5*a* may be included in the processing circuit 5*b*.

Printing path information Da is recorded in the storage circuit 5*a*. The printing path information Da is information which is used for controlling the operation of the robot 2 and indicates a position and a posture of the head 3*a* in a path RT, which is a path to be described below, along which the head 3*a* is to be moved when a printing operation is executed. The printing path information Da includes information indicating a change in relative position of the head 3*a* with respect to the workpiece W when the printing operation is executed, and information indicating a change in relative posture of the head 3*a* with respect to the workpiece W when the printing operation is executed. The printing path information Da is represented by using, for example, the coordinate values of the workpiece coordinate system, the base coordinate system, or the world coordinate system. When the printing path information Da is represented by using a coordinate value of the workpiece coordinate system, the printing path information Da is used for controlling the operation of the robot 2 after conversion from the coordinate value of the workpiece coordinate system to a coordinate value of the base coordinate system or the world coordinate system.

The processing circuit 5*b* controls an operation of the arm drive mechanism 2*a* of the robot 2 based on the printing path information Da, and generates the signal D3. The processing circuit 5*b* includes, for example, one or more processors such as a central processing unit (CPU). The processing circuit 5*b* may include a programmable logic device such as a field-programmable gate array (FPGA), instead of the CPU or in addition to the CPU.

Here, the arm drive mechanism 2*a* is an aggregation of the drive mechanisms of the joints 230_1 to 230_6 described above, and includes a motor for driving the joint of the robot 2 and encoders 241_1 to 241_6 that measure a rotation angle of the joint of the robot 2, for each joint 230.

The processing circuit 5*b* performs an inverse kinematics calculation, which is an arithmetic operation for converting the printing path information Da into the operation amount such as a rotation angle and a rotation speed of each joint 230 of the robot 2. The processing circuit 5*b* outputs control signals Sk_1 to Sk_6 based on output signals D1_1 to D1_6 from each of the encoders 241_1 to 241_6 of the arm drive mechanism 2*a* such that the operation amount such as the actual rotation angle and the rotation speed of each joint 230 becomes the arithmetic operation result described above based on the printing path information Da. Each of the control signal Sk_1 to the control signal Sk_6 corresponds to each of the joint 230_1 to the joint 230_6, and controls the drive of the motor provided in the corresponding joint 230. Each of the output signal D1_1 to the output signal D1_6 corresponds to each of the encoder 241_1 to the encoder 241_6. Hereinafter, each of the output signal D1_1 to the output signal D1_6 may be collectively referred to as an output signal D1. The control signals Sk_1 to Sk_6 are signals for controlling the drive of the motor of the arm drive mechanism 2*a*. Here, the control signals Sk_1 to Sk_6 are corrected by the processing circuit 5*b* based on an output from a distance sensor (not illustrated), as needed.

Further, the processing circuit 5*b* generates the signal D3, based on the output signal D1 from at least one of the encoders 241_1 to 241_6 included in the arm drive mechanism 2*a*. For example, the processing circuit 5*b* generates a trigger signal including a pulse at a timing at which the output signal D1 from one of the plurality of encoders becomes a predetermined value as the signal D3.

The control module 6 is a circuit that controls an ink ejection operation in the head unit 3 based on the signal D3 output from the controller 5 and print data Img from the computer 7. The print data Img is information indicating an image to be printed on the workpiece W along each of a plurality of paths indicated by the printing path information Da. The control module 6 includes a timing signal generation circuit 6*a*, a power supply circuit 6*b*, a control circuit 6*c*, and a drive signal generation circuit 6*d*.

The timing signal generation circuit 6*a* generates a timing signal PTS based on the signal D3. The timing signal generation circuit 6*a* is configured with, for example, a timer that starts generation of the timing signal PTS by using detection of the signal D3 as a trigger.

The power supply circuit 6*b* receives power from a commercial power supply (not illustrated) to generate various predetermined potentials. The various generated potentials are appropriately supplied to each portion of the control module 6 and the head unit 3. For example, the power supply circuit 6*b* generates a power supply potential VHV and an offset potential VBS. The offset potential VBS is supplied to the head unit 3. Further, the power supply potential VHV is supplied to the drive signal generation circuit 6*d*.

The control circuit 6*c* generates a control signal SI, a waveform designation signal dCom, a latch signal LAT, a clock signal CLK, and a change signal CNG, based on the timing signal PTS. These signals are synchronized with the timing signal PTS. Among these signals, the waveform designation signal dCom is input to the drive signal generation circuit 6*d*, and the other signals are input to the switch circuit 3*e* of the head unit 3.

The control signal SI is a digital signal for designating an operation state of a piezoelectric element 311 included in the head 3*a* of the head unit 3. Specifically, the control signal SI is a signal for designating whether or not to supply a drive signal Com, which will be described below, to the piezoelectric element 311 based on the print data Img. With this designation, for example, whether or not to eject inks from a nozzle N corresponding to the piezoelectric element 311 is designated, and the amount of ink ejected from the nozzle N is designated. The waveform designation signal dCom is a digital signal for defining a waveform of the drive signal Com. The latch signal LAT and the change signal CNG are signals for defining an ejection timing of the ink from the nozzle N, in combination with the control signal SI, by defining a drive timing of the piezoelectric element 311. The clock signal CLK is a reference clock signal synchronized with the timing signal PTS.

The above control circuit 6*c* includes, for example, one or more processors such as a CPU. The control circuit 6*c* may include a programmable logic device such as an FPGA instead of the CPU or in addition to the CPU.

The drive signal generation circuit 6*d* is a circuit that generates the drive signal Com for driving each drive element included in the head 3*a* of the head unit 3. Specifically, the drive signal generation circuit 6*d* includes, for example, a DA conversion circuit and an amplifier circuit. In the drive signal generation circuit 6*d*, the DA conversion circuit converts the waveform designation signal dCom from the control circuit 6*c* from a digital signal to an analog signal, and the amplifier circuit uses the power supply potential VHV from the power supply circuit 6*b* to amplify the analog signal and generate the drive signal Com. Here, among waveforms included in the drive signal Com, a signal of a waveform actually supplied to the piezoelectric element 311 is a drive pulse PD. The drive pulse PD is supplied from the drive signal generation circuit 6*d* to the piezoelectric element 311, via the switch circuit 3*e* of the head unit 3.

Here, the switch circuit 3*e* is a circuit including a switching element that switches whether or not to supply at least a part of the waveform included in the drive signal Com as the drive pulse PD based on the control signal SI.

The computer 7 has a function of generating the printing path information Da, a function of supplying information such as the printing path information Da to the controller 5, and a function of supplying information such as the print data Img to the control module 6. For example, the computer 7 generates the printing path information Da based on workpiece information indicating a position and a shape of the workpiece W, and provides the generated printing path information Da to the controller 5. The computer 7 is, for example, a PC. The computer 7 functions as a user interface of the three-dimensional object printing apparatus 1, and a user of the three-dimensional object printing apparatus 1 causes the robot 2 and the head unit 3 to execute a plurality of printing operations including a first printing operation and a second printing operation, which will be described below, via the controller 5 and the control module 6. The computer 7 further has a function of controlling a drive of the energy emitting portion 3*c*.

As described above, by controlling the drive of the robot 2 based on the printing path information Da and controlling the drive of the head 3*a* based on the print data Img and the signal D3, the plurality of printing operations are performed. In each printing operation of the plurality of printing operations, while the robot 2 changes the position and the posture of the head 3*a* based on the printing path information Da, the head 3*a* ejects inks from the head 3*a* toward the workpiece W at an appropriate timing based on the print data Img and the signal D3. Thus, an image based on the print data Img is formed at the workpiece W.

1-3. Configuration of Head Unit

Figure 3:
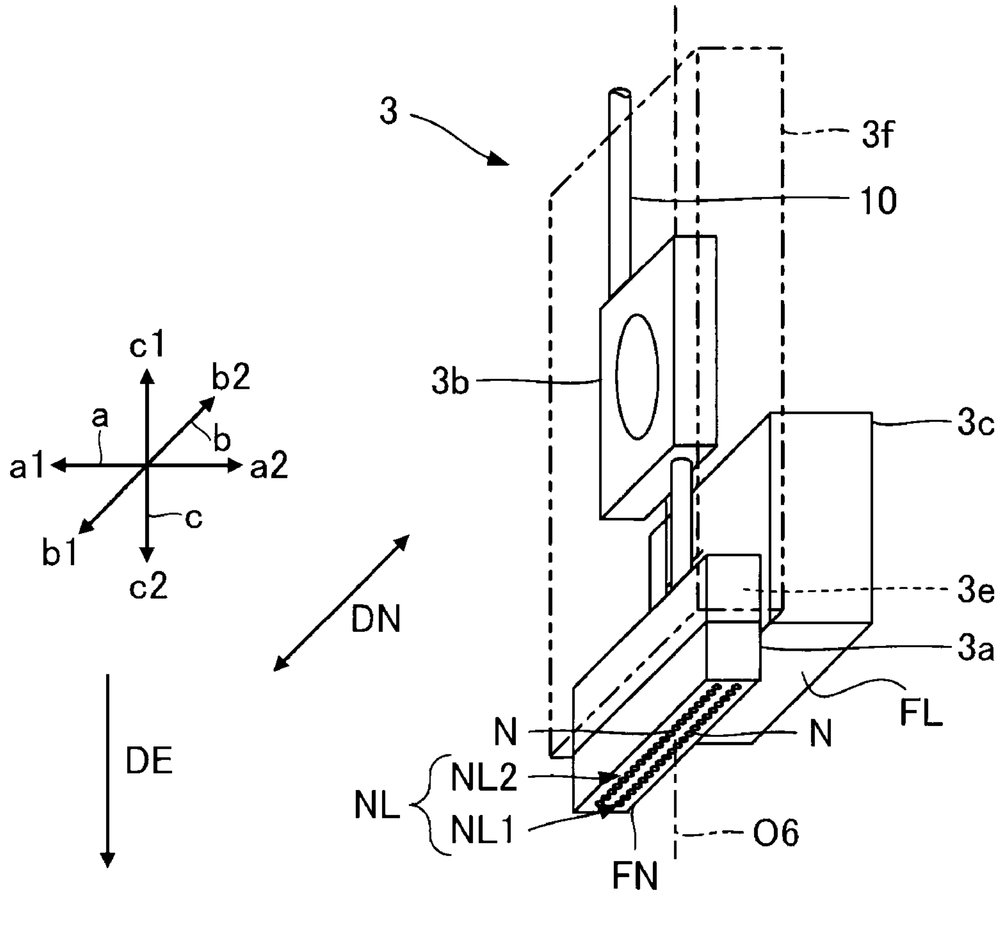
FIG. 3 is a perspective view illustrating a schematic configuration of a head unit.

FIG. 3 is a perspective view illustrating a schematic configuration of the head unit 3. In the following description, for convenience, an a-axis, a b-axis, and a c-axis that intersect with each other will be appropriately used. Further, in the following description, one direction along the a-axis is an a1 direction, and a direction opposite to the a1 direction is an a2 direction. In the same manner, directions opposite to each other along the b-axis are a b1 direction and a b2 direction. Further, directions opposite to each other along the c-axis are a c1 direction and a c2 direction.

Here, the a-axis, the b-axis, and the c-axis correspond to coordinate axes of a tool coordinate system set in the head unit 3, and relative positions and relationships of postures with the world coordinate system or the robot coordinate system described above are changed by the operation of the robot 2 described above. In the example illustrated in FIG. 3, the c-axis is an axis parallel with the rotation axis O6 described above. The a-axis, the b-axis, and the c-axis are typically orthogonal to each other without being limited thereto, and may intersect at an angle within a range of 80° or more and 100° or less, for example. The tool coordinate system and the base coordinate system or the robot coordinate system are associated with each other by calibration.

As described above, the head unit 3 has the head 3*a*, the pressure regulating valve 3*b*, and the energy emitting portion 3*c*. The head 3*a*, the pressure regulating valve 3*b*, and the energy emitting portion 3*c* are supported by a support body 3*f* illustrated by a two-dot chain line in FIG. 3. In the example illustrated in FIG. 3, the number of each of the head 3*a* and the pressure regulating valve 3*b* included in the head unit 3 is one. Meanwhile, the number is not limited to the example illustrated in FIG. 3, and may be equal to or more than 2. Further, an installation position of the pressure regulating valve 3*b* is not limited to the arm 226, and may be, for example, another arm or the like, or may be a fixed position with respect to the base portion 210.

The support body 3*f* is made of, for example, a metal material or the like, and is a substantially rigid body. In FIG. 3, the support body 3*f* has a planar box shape, and a shape of the support body 3*f* is not particularly limited and is any shape.

The above support body 3*f* is mounted to the arm 226 described above. Therefore, the head 3*a*, the pressure regulating valve 3*b*, and the energy emitting portion 3*c* are collectively supported on the arm 226 by the support body 3*f*. Therefore, each relative position of the head 3*a*, the pressure regulating valve 3*b*, and the energy emitting portion 3*c* with respect to the arm 226 is fixed. In the example illustrated in FIG. 3, the pressure regulating valve 3*b* is disposed at a position in the c1 direction with the head 3*a*. The energy emitting portion 3*c* is disposed at a position in the a2 direction with respect to the head 3*a*.

The head 3*a* has the nozzle surface FN and a plurality of nozzles N that are opened on the nozzle surface FN. The plurality of nozzles N are divided into a first nozzle array NL1 and a second nozzle array NL2 aligned apart from each other in a direction along the a-axis. Each of the first nozzle array NL1 and the second nozzle array NL2 is a set of the plurality of nozzles N linearly arrayed in a nozzle array direction DN which is a direction along the b-axis. Here, elements related to each of the nozzles N of the first nozzle array NL1 and elements related to each of the nozzles N of the second nozzle array NL2 in the head 3*a* are configured to be substantially symmetrical with each other in a direction along the a-axis.

Meanwhile, positions of the plurality of nozzles N in the first nozzle array NL1 and the plurality of nozzles N in the second nozzle array NL2 in the direction along the b-axis may or may not coincide with each other. The elements related to each nozzle N of one of the first nozzle array NL1 and the second nozzle array NL2 may be omitted. In the following, a configuration in which the positions of the plurality of nozzles N in the first nozzle array NL1 and the plurality of nozzles N in the second nozzle array NL2 in the direction along the b-axis coincide with each other will be described.

Although not illustrated, the head 3*a* has the piezoelectric element 311 and a cavity for accommodating inks, for each nozzle N. Here, the piezoelectric element 311 ejects the ink from the nozzle N corresponding to the cavity in an ejection direction DE by changing a pressure of the cavity corresponding to the piezoelectric element 311, and a liquid droplet, which is a droplet of the ink, is landed on the surface of the workpiece W. Such a head 3*a* can be obtained, for example, by bonding a plurality of substrates such as a silicon substrate appropriately processed by etching or the like with an adhesive or the like. As a drive element for ejecting the ink from the nozzle N, a heater that heats the ink in the cavity may be used, instead of the piezoelectric element 311.

Ink is supplied to the above head 3*a* from an ink tank, which is not illustrated, via the piping portion 10. Here, the piping portion 10 is coupled to the head 3*a* via the pressure regulating valve 3*b*.

The pressure regulating valve 3*b* is a valve mechanism that is opened and closed according to a pressure of the ink in the head 3*a*. By this opening and closing, the pressure of the ink in the head 3*a* is maintained at a negative pressure within a predetermined range even when a positional relationship between the head 3*a* and the ink tank described above is changed. Therefore, a meniscus of the ink formed at the nozzle N of the head 3*a* is stabilized. As a result, it is possible to prevent air bubbles from entering the nozzle N, and the ink from overflowing from the nozzle N. Further, the ink from the pressure regulating valve 3*b* is appropriately distributed to a plurality of locations of the head 3*a* via a branch flow path, which is not illustrated. Here, the ink from the ink tank is supplied to the pressure regulating valve 3*b* at a predetermined pressure by a pump or the like.

The energy emitting portion 3*c* emits energy such as light, heat, an electron beam, or radiation for curing or solidifying the ink on the workpiece W. For example, when the ink has ultraviolet curability, the energy emitting portion 3*c* is configured with a light emitting element such as a light emitting diode (LED) that emits ultraviolet rays. Further, the energy emitting portion 3*c* may appropriately have an optical component such as a lens for adjusting an emitting direction or an emitting range of the energy.

As illustrated in FIG. 3, since the head unit 3 has the head 3*a*, the robot 2 changes the relative position and posture between the workpiece W and the head 3*a*. The changing of the relative position and posture between the workpiece W and the head 3*a* means changing a position and a posture of the head 3*a* while the workpiece W is fixed and changing a position and a posture of the workpiece W while the head 3*a* is fixed. Further, the position and the posture of the workpiece W may be changeable, and the position and the posture of the head 3*a* may be changeable. In the present embodiment, the robot 2 changes the position and the posture of the head 3*a* while fixing the workpiece W. The robot 2 is an example of a "movement mechanism".

1-4. Printing Operation on Curved Surface

When an image is formed in the printing region Wa, which includes a curved surface, the three-dimensional object printing apparatus 1 divides the printing region Wa into a plurality of band regions BR, and forms a partial image in each of the band regions BR to form the image on the printing region Wa. The band region BR is a strip-shaped region. A longitudinal direction of the band region BR is substantially a main scanning direction, and a lateral direction of the band region BR is substantially a sub-scanning direction. Hereinafter, a width of the band region BR in the lateral direction may be referred to as a width of the band region BR. When printing on the printing region Wa, which includes a curved surface, it is necessary to change the width of the band region BR according to the longitudinal direction of the band region BR. In other words, a shape of the band region BR is not a rectangular shape. The shape that is not the rectangular shape is, for example, a substantially elliptical shape, a rhomboidal shape, a trapezoidal shape, or the like. The reason for changing the width of the band region BR is that a distance between the nozzle N of the head 3*a* and the printing region Wa is to be kept within a predetermined range since an air flow is generated by changing the relative position and posture between the workpiece W and the head 3*a* and landing accuracy of liquid droplets is decreased due to an influence of the air flow described above as the distance between the nozzle N of the head 3*a* and the printing region Wa is larger.

Meanwhile, when the band region BR does not overlap with the adjacent band region BR, a so-called white spot, which is a region in which no image is partially formed, occurs when a positional deviation occurs in at least one band region BR in the longitudinal direction and the lateral direction. In particular, when the head 3*a* is scanned by using a 6-axis vertical articulated robot as in the present embodiment, a fluctuation of a speed in the main scanning direction and meandering in the sub-scanning direction are large, and it is difficult to eliminate the white spot without overlapping with the band region BR. Therefore, since the band region BR has an overlapping region DR in which the band region BR overlaps with the adjacent band region BR, the occurrence of the white spot can be reduced. Meanwhile, experiments by the inventors clarify that a low quality image may be formed in the overlapping region DR. More specifically, when a direction in which an ink flies to one band region BR among the adjacent band regions BR is significantly different from a direction in which an ink flies to the other band region BR, it is understood that one or both of a low local density and a high local density of the liquid droplets occur. Hereinafter, one or both of the low local density and the high local density of the liquid droplets may be collectively referred to as "uneven liquid droplets". The uneven liquid droplets will be described with reference to FIGS. 4 and 5.

Figure 4:
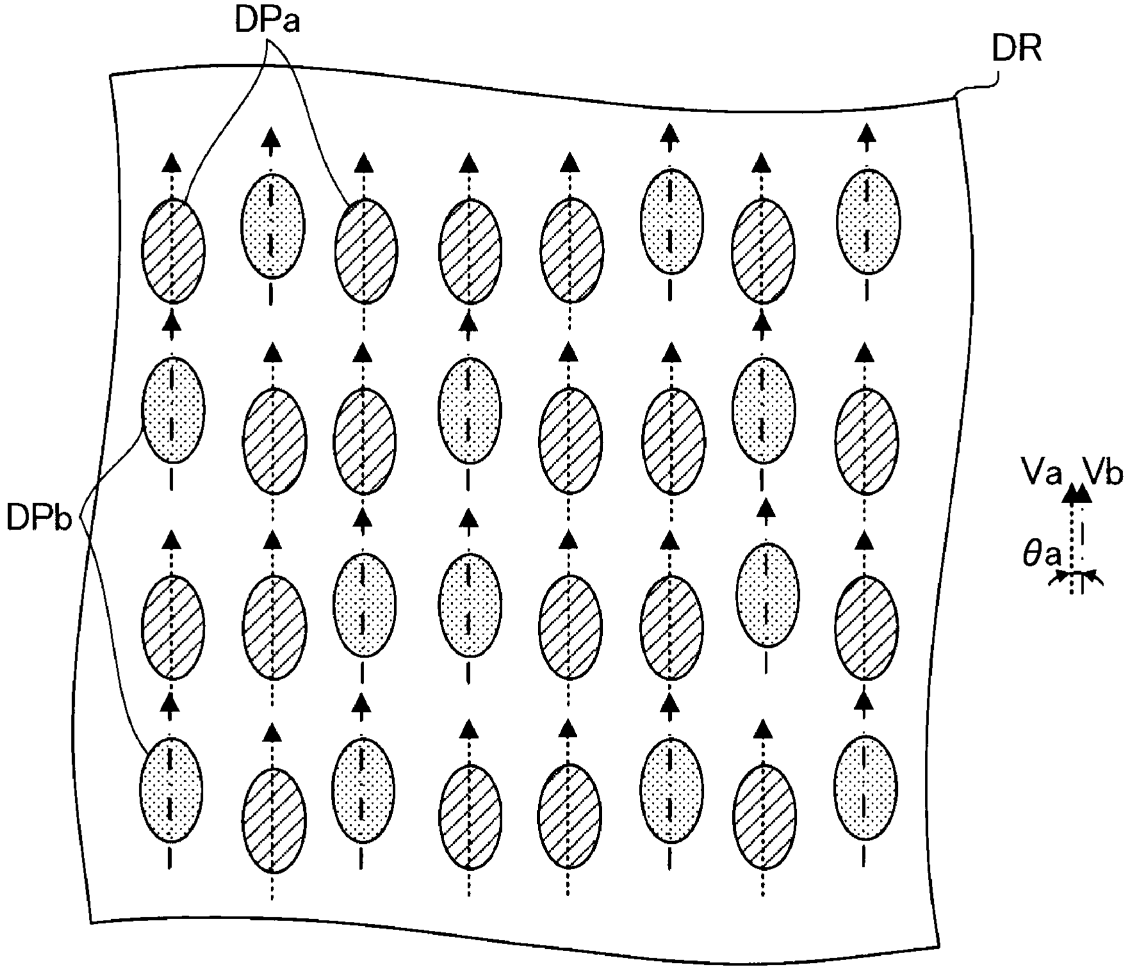
FIG. 4 is a diagram describing uneven liquid droplets.
Figure 5:
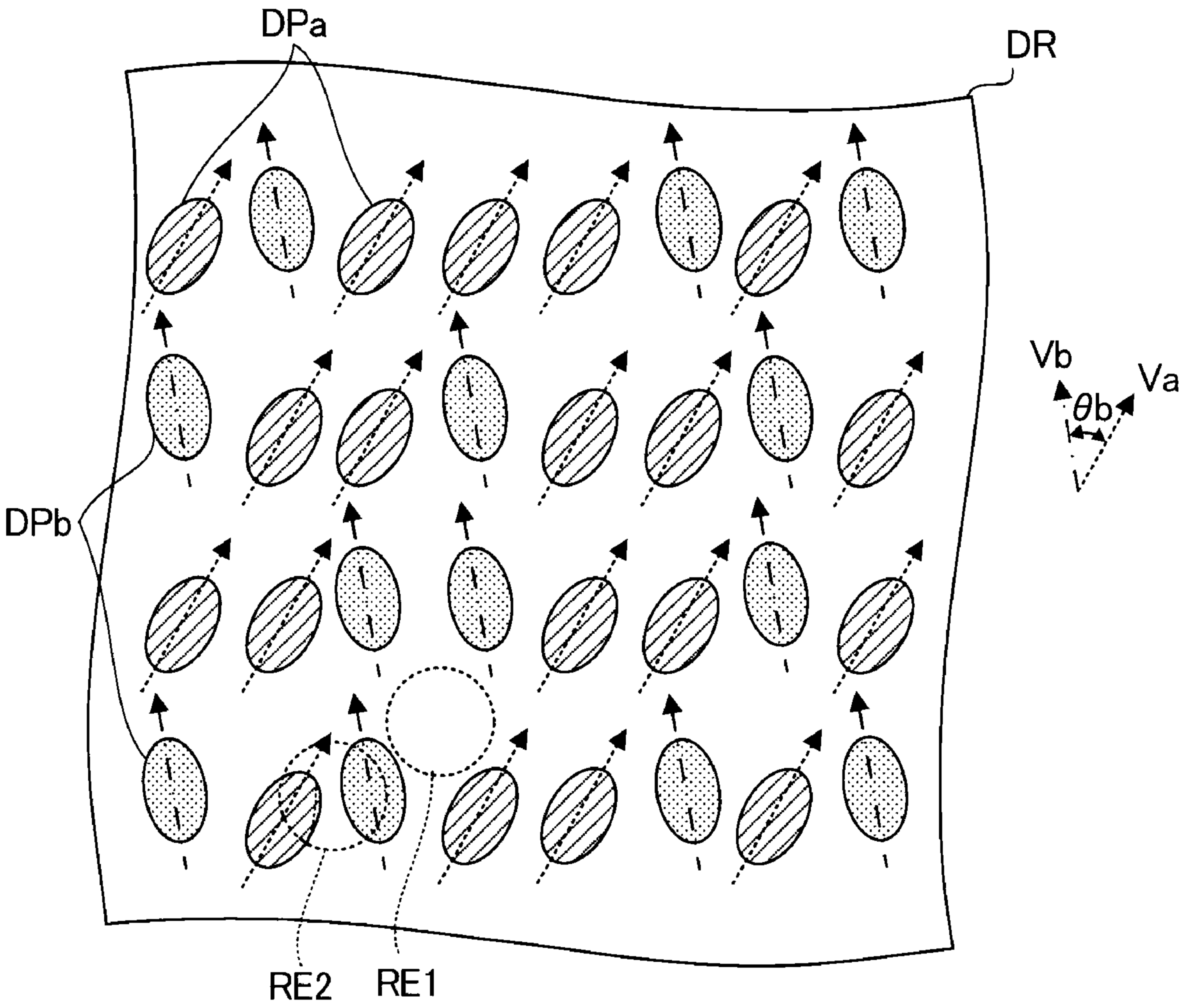
FIG. 5 is a diagram describing the uneven liquid droplets.

FIG. 4 and FIG. 5 are diagrams describing the uneven liquid droplets. In FIGS. 4 and 5, in the overlapping region DR, a vector Va indicating a flight direction in which an ink flies immediately before liquid droplets DPa land on one band region BR, and a vector Vb indicating a flight direction in which the ink flies immediately before liquid droplets DPb land on the other band region BR are illustrated, when the workpiece W is viewed from the head 3*a*. FIG. 4 illustrates a state in which an angle θa formed by the vector Va and the vector Vb is substantially 0°, that is, the vector Va and the vector Vb are substantially parallel to each other. In general, the ejection direction DE in which an ink is ejected from the head 3*a* is a direction substantially perpendicular to the nozzle surface FN. Meanwhile, a flight direction deviates from the ejection direction DE due to the influence of the inertial force due to the movement of the head 3*a*. That is, the movement direction of the head 3*a* when the liquid droplet DPa in FIG. 4 is ejected and the movement direction of the head 3*a* when the liquid droplet DPb in FIG. 4 is ejected are substantially parallel to each other. Further, although different from the present embodiment, in an aspect in which the workpiece W moves, the flight direction may deviate from the ejection direction DE due to the air flow or the like generated by changing the relative position between the workpiece W and the head 3*a*. On the other hand, FIG. 5 illustrates a state in which an angle θb formed by the vector Va and the vector Vb is substantially 40°. That is, the movement direction of the head 3*a* when the liquid droplet DPa in FIG. 5 is ejected and the movement direction of the head 3*a* when the liquid droplet DPb in FIG. 5 is ejected are not parallel to each other.

In the state in FIG. 5, as compared to the state in FIG. 4, since the vector Va and the vector Vb are not parallel, the arrangement of the liquid droplets DPa and the liquid droplets DPb varies. As a result of the variation in the arrangement of the liquid droplets DPa and the liquid droplets DPb, in a region RE1 in which the liquid droplets DPa and the liquid droplets DPb are sparse, a droplet density is locally low, and in a region RE2 in which the liquid droplets DPa and the liquid droplets DPb are concentrated, the droplet density is locally high.

As understood from FIGS. 4 and 5, the more the angle formed by the vector Va and the vector Vb, the uneven liquid droplets likely occur. Specifically, an image quality becomes most appropriate when the angle formed by the vector Va and the vector Vb is 0° or 180°, and the image quality becomes most degraded when the angle is 90°. Therefore, in the present embodiment, in the overlapping region DR, an area of a region in which the angle formed by the vector Va and the vector Vb is large is made relatively small. On the other hand, in the overlapping region DR, an area of a region in which the angle formed by the vector Va and the vector Vb is small is made relatively large. For simplification of the description, in the present embodiment, the angle formed by the vector Va and the vector Vb is set to 0° to 90°, and when the angle formed by the vector Va and the vector Vb is from 90° to 180°, a value obtained by subtracting the angle formed by the vector Va and the vector Vb from 180° is set as the angle formed by the vector Va and the vector Vb in the present embodiment. For example, cos, which is the angle formed by the vector Va and the vector Vb, can be calculated by an inner product of the vector Va having a length 1 and the vector Vb having a length 1. For example, when the inner product of the vector Va having the length 1 and the vector Vb having the length 1 is −0.5, the angle formed by the vector Va and the vector Vb is 120°. Meanwhile, in the present embodiment, 180°-120°=60° is regarded as the angle formed by the vector Va and the vector Vb.

Figure 6:
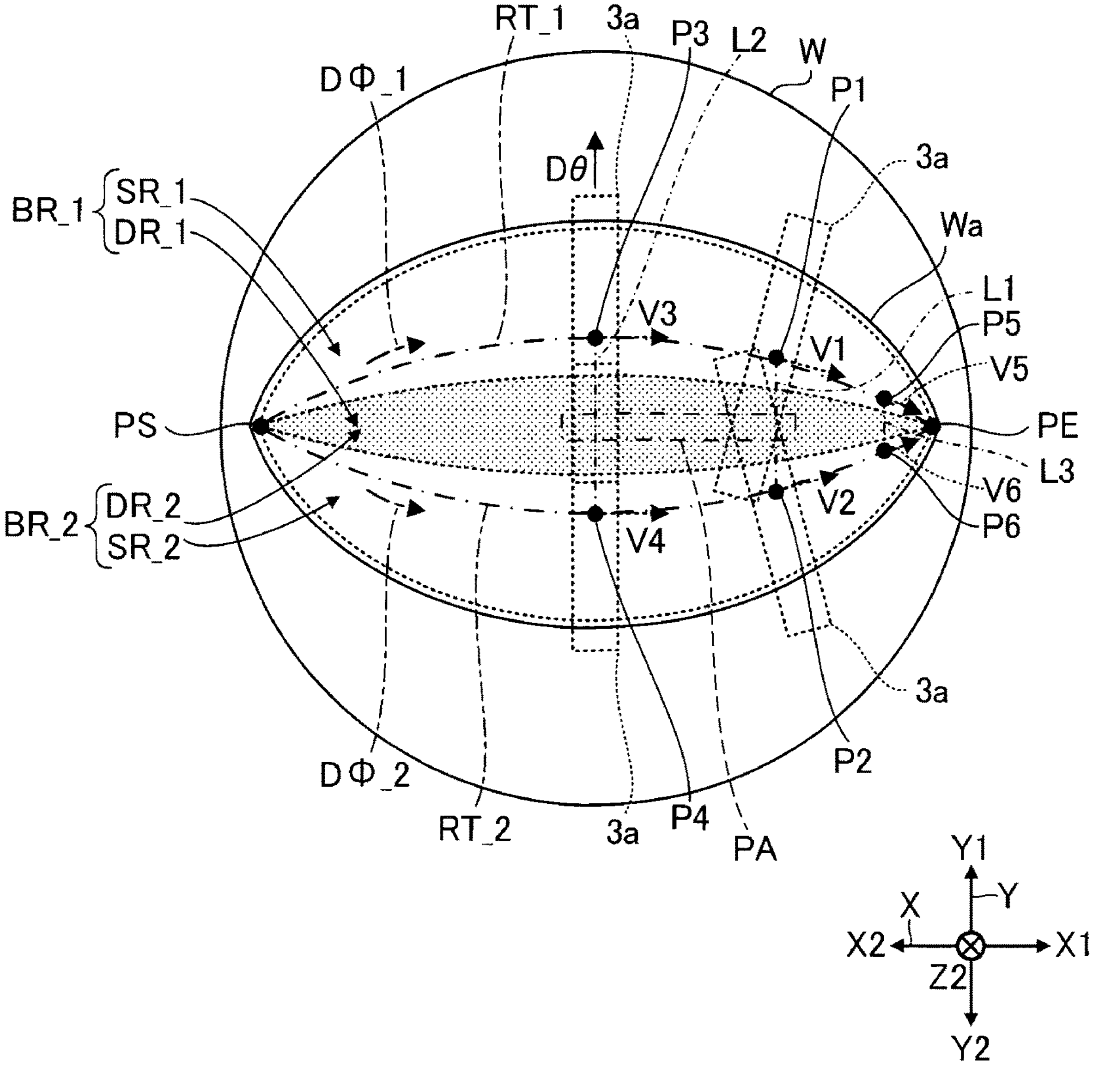
FIG. 6 is a diagram describing a band region according to the present embodiment.
Figure 7:
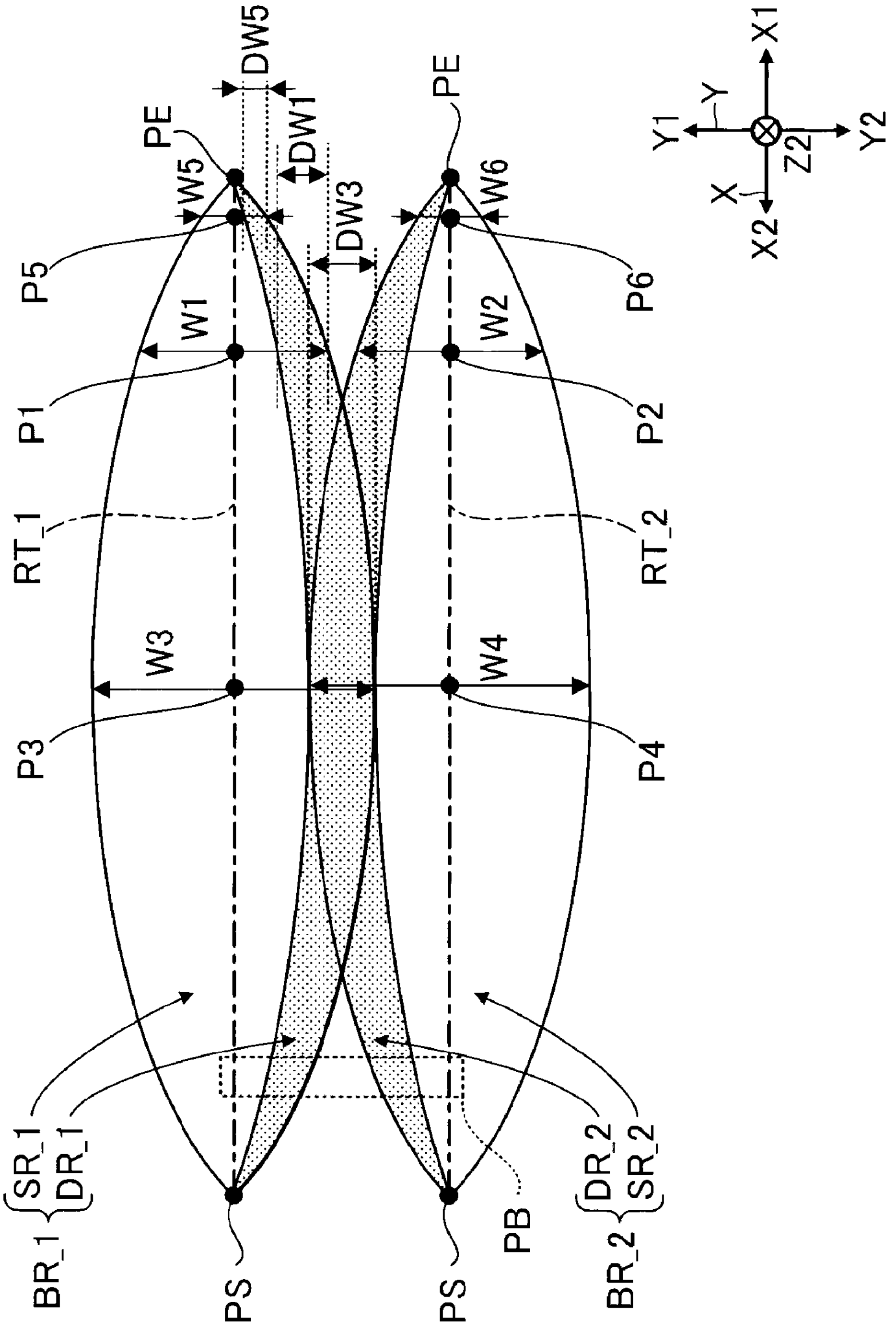
FIG. 7 is a diagram describing the band region according to the present embodiment.

FIGS. 6 and 7 are diagrams describing the band region BR according to the present embodiment. FIG. 6 illustrates a plan view of the workpiece W viewed in the Z2 direction, and in FIG. 7, the plurality of band regions BR are expanded on an XY plane for easy understanding. In FIG. 6, as a display for convenience, the band region BR is displayed slightly smaller such that a contour of the band region BR does not overlap with a contour of the printing region Wa.

As illustrated in FIG. 6, the printing region Wa includes a band region BR_1 and a band region BR_2. Hereinafter, each of the band region BR_1 and the band region BR_2 may be collectively referred to as a band region BR without distinguishing the band region BR_1 and the band region BR_2. The number of the band regions BR is not limited to two, and may be three or more. The band region BR_1 is located in the Y1 direction with respect to the band region BR_2. In addition, in the first embodiment, a shape of the band region BR_1 and a shape of the band region BR_2 are substantially the same as each other. Meanwhile, the shapes may be different from each other, and any one of the band region BR_1 and the band region BR_2 may have a rectangular shape. The shape of the band region BR can be appropriately adjusted according to a shape of the printing region Wa.

FIGS. 6 and 7 illustrate a first position P1, a third position P3, and a fifth position P5 in a path RT_1, and a second position P2, a fourth position P4, and a sixth position P6 in a path RT_2. Further, FIG. 6 illustrates a contour of the head 3*a* when the head 3*a* is located at each of the first position P1, the second position P2, the third position P3, and the fourth position P4. A distance from the first position P1 to the fifth position P5 along the path RT_1 is equal to a distance from the second position P2 to the sixth position P6 along the path RT_2. For ease of understanding, the respective positions are illustrated as points on the path RT, and it can be said that these positions represent predetermined sections on the path RT. For example, it can be said that the first position P1 is a point representing a predetermined section of the path RT_1 from the first position P1 on the path RT in a forward-rearward direction. Here, the predetermined section is a section less than a length of the band region BR in a main scanning direction DΦ to be described below, with comparison, a distance by which the head 3*a* is moved while ejecting several to several tens of liquid droplets, for example.

The third position P3 is located at a center of the band region BR_1 on the X-axis. The fifth position P5 is located at an end portion of the band region BR_1 in the X1 direction. The first position P1 is located between the third position P3 and the fifth position P5 in the path RT_1. The fourth position P4 is located at a center of the band region BR_2 on the X-axis. The sixth position P6 is located at an end portion of the band region BR_2 in the X1 direction. The second position P2 is located between the fourth position P4 and the sixth position P6 in the path RT_2.

As illustrated in FIG. 7, the band region BR is a substantially elliptical region extending along the X-axis when viewed in the Z2 direction. That is, when viewed in the Z2 direction, a longitudinal direction of the band region BR is a direction along the X-axis, and a lateral direction of the band region BR is a direction along the Y-axis. Regarding the specific shape of the band region BR, a width at a center of the band region BR on the X-axis is the largest, and the width of the band region BR becomes smaller toward the X2 direction or the X1 direction. Specifically, among a width W3 of the band region BR_1 at the third position P3, a width W1 of the band region BR_1 at the first position P1, and a width W5 of the band region BR_1 at the fifth position P5, the width W3 is the largest, the width W1 is the next largest, and the width W5 is the smallest. In addition, among a width W4 of the band region BR_2 at the fourth position P4, a width W2 of the band region BR_2 at the second position P2, and a width W6 of the band region BR_2 at the sixth position P6, the width W4 is the largest, the width W2 is the next largest, and the width W6 is the smallest. In FIG. 7, in order to make it easier to understand the lengths of the width W4 and the width W3, as a display for convenience, the positions of the third position P3 and the fourth position P4 on the X-axis are slightly shifted and displayed.

As illustrated in FIGS. 6 and 7, while the head 3*a* is moved along the path RT_1 based on the printing path information Da, a partial image is formed in the band region BR_1 by ejecting inks from the head 3*a*. More specifically, the fact that the head 3*a* is moved along any one path means that the robot 2 operates such that a tool center point set in the vicinity of the head 3*a* is moved along the path. The tool center point is a virtual reference point representing the head 3*a*, and is set at, for example, a position moved along the ejection direction DE by approximately several mm from a center or a center of gravity of the nozzle array NL provided on the nozzle surface FN. While the head 3*a* is moved along the path RT_2 based on the printing path information Da, a partial image is formed in the band region BR_2 by ejecting the inks from the head 3*a*.

The path RT_1 and the path RT_2 are paths from a start position PS to an end position PE along the surface of the workpiece W. Here, a main scanning direction DΦ_1 is a direction defined by the path RT_1. The main scanning direction DΦ_1 is a longitudinal direction of the band region BR_1 and is a direction along the path RT_1, and the direction is constantly changed. The main scanning direction DΦ_1 can be said to be a direction in which a relative movement distance of the head 3*a* is largest in a printing operation on the band region BR_1. In the same manner, a main scanning direction DΦ_2 is a direction defined by the path RT_2. The main scanning direction DΦ_2 is a direction along the path RT_2, and the direction is constantly changed. The main scanning direction DΦ_2 can be said to be a direction in which the relative movement distance of the head 3*a* is largest in the printing operation on the band region BR_2. The arrangement of the start position PS and the end position PE in the present embodiment is an example, and the arrangement of the start position PS and the end position PE of one or both paths RT may be reversed in a direction along the X-axis.

In the following description, each of the path RT_1 and the path RT_2 may be collectively referred to as a path RT without distinguishing the path RT_1 and the path RT_2. In the same manner, without distinguishing each of the main scanning direction DΦ_1 and the main scanning direction DΦ_2, the main scanning direction DΦ_1 and the main scanning direction DΦ_2 may be collectively referred to as a main scanning direction DΦ. The main scanning direction DΦdefines a vector by a start point and an end point of the relative movement of the head 3*a* for each printing operation on each band region BR, and can be said to be a direction parallel to a vector obtained by combining these vectors. Therefore, the main scanning direction DΦ is a concept indicating a direction substantially equal to the main scanning direction DΦ_1 and the main scanning direction DΦ_2. As can be understood from FIG. 6, in the present embodiment, the main scanning direction DΦ is a direction parallel to the X-axis.

In the following description, a direction orthogonal to the main scanning direction DΦ is referred to as a sub-scanning direction DΦ. More strictly, the sub-scanning direction DΦ is a direction that is orthogonal to the main scanning direction DΦ, and is along the printing region Wa. In the present embodiment, the sub-scanning direction Dθ is a direction rotating around the X-axis, and is a direction along the Y-axis as illustrated in FIG. 6 when viewed in a direction along the Z-axis.

Here, the first position P1 and the second position P2 have the same positions in the main scanning direction DΦ, the third position P3 and the fourth position P4 have the same positions in the main scanning direction DΦ, and the fifth position P5 and the sixth position P6 have the same positions in the main scanning direction DΦ.

As illustrated in FIG. 6, the certain band region BR has the overlapping region DR that is a region overlapping with the adjacent band region BR. In the band region BR, a region that does not overlap with the adjacent band region BR may be described as a non-overlapping region SR. Specifically, as illustrated in FIGS. 6 and 7, the band region BR_1 has a non-overlapping region SR_1 and an overlapping region DR_1 that overlaps with the band region BR_2. The band region BR_2 has a non-overlapping region SR_2 and an overlapping region DR_2 that overlaps with the band region BR_1. In the following description, each of the non-overlapping region SR_1 and the non-overlapping region SR_2 may be described as a non-overlapping region SR without distinguishing the non-overlapping region SR_1 and the non-overlapping region SR_2. Further, without distinguishing each of the overlapping region DR_1 and the overlapping region DR_2, the overlapping region DR_1 and the overlapping region DR_2 may be described as the overlapping region DR. As illustrated in FIGS. 6 and 7, in the first embodiment, the overlapping region DR exists from one end to the other end of the X-axis of the band region BR.

A flight direction of an ink at a certain position in the path RT when the workpiece W is viewed from the head 3a along the ejection direction DE approximately coincides with a vector at the position in the path RT. The vector of the certain position in the path RT is a vector representing a relative movement between the workpiece W and the head 3a at this position, and is a tangent line vector of the path RT at this position. Further, it can be said that the vector at the certain position in the path RT is a vector representing a relative movement between the workpiece W and the head 3a in a predetermined section of the path RT in the forward-rearward direction, which is represented by this position. In FIG. 6, a vector V1 of the first position P1 in the path RT_1, a vector V2 of the second position P2 in the path RT_2, a vector V3 of the third position P3 in the path RT_1, a vector V4 of the fourth position P4 in the path RT_2, a vector V5 of the fifth position P5 in the path RT_1, and a vector V6 of the sixth position P6 in the path RT_2 are illustrated.

As illustrated in FIG. 6, a first virtual line segment L1 coupling the first position P1 and the second position P2 along the surface of the workpiece W, and a second virtual line segment L2 coupling the third position P3 and the fourth position P4 along the surface of the workpiece W do not intersect with each other. More specifically, the first virtual line segment L1 and the second virtual line segment L2 are parallel to the sub-scanning direction Dθ. Therefore, the first virtual line segment L1 and the second virtual line segment L2 are parallel to each other. The fact that the first virtual line segment L1 and the second virtual line segment L2 on a curved surface are parallel means that a distance between the first virtual line segment L1 and the second virtual line segment L2 is constant. Therefore, a line segment coupling the first position P1 and the third position P3 along the surface of the workpiece W and a line segment coupling the second position P2 and the fourth position P4 along the surface of the workpiece W have the same length. Meanwhile, the first virtual line segment L1 and the second virtual line segment L2 may not be parallel to each other.

As illustrated in FIG. 6, a third virtual line segment L3 coupling the fifth position P5 and the sixth position P6 along the surface of the workpiece W does not intersect with the first virtual line segment L1 and the second virtual line segment L2. More specifically, the third virtual line segment L3 is parallel to the first virtual line segment L1 and the second virtual line segment L2. Meanwhile, the third virtual line segment L3 may not be parallel to the first virtual line segment L1 and the second virtual line segment L2. The third virtual line segment L3 is located between the first virtual line segment L1 and the second virtual line segment L2.

The band region BR_1 is an example of a “first band region”, the path RT_1 is an example of a “first path”, and a printing operation of ejecting inks from the head 3a onto the workpiece W while being changed by the path RT_1 along the main scanning direction DΦ_1 is an example of a “first printing operation”. Further, the band region BR_2 is an example of a “second band region”, the path RT_2 is an example of a “second path”, and a printing operation of ejecting the inks from the head 3a to the workpiece W while being changed by the path RT_2 along the main scanning direction DΦ_2 is an example of a “second printing operation”.

A magnitude of an angle formed by vectors in the two adjacent paths RT is small at a center of the band region BR, and becomes large at an end portion of the band region BR. A specific example of a deviation in a direction in which the ink lands will be described with reference to FIG. 8.

Figure 8:
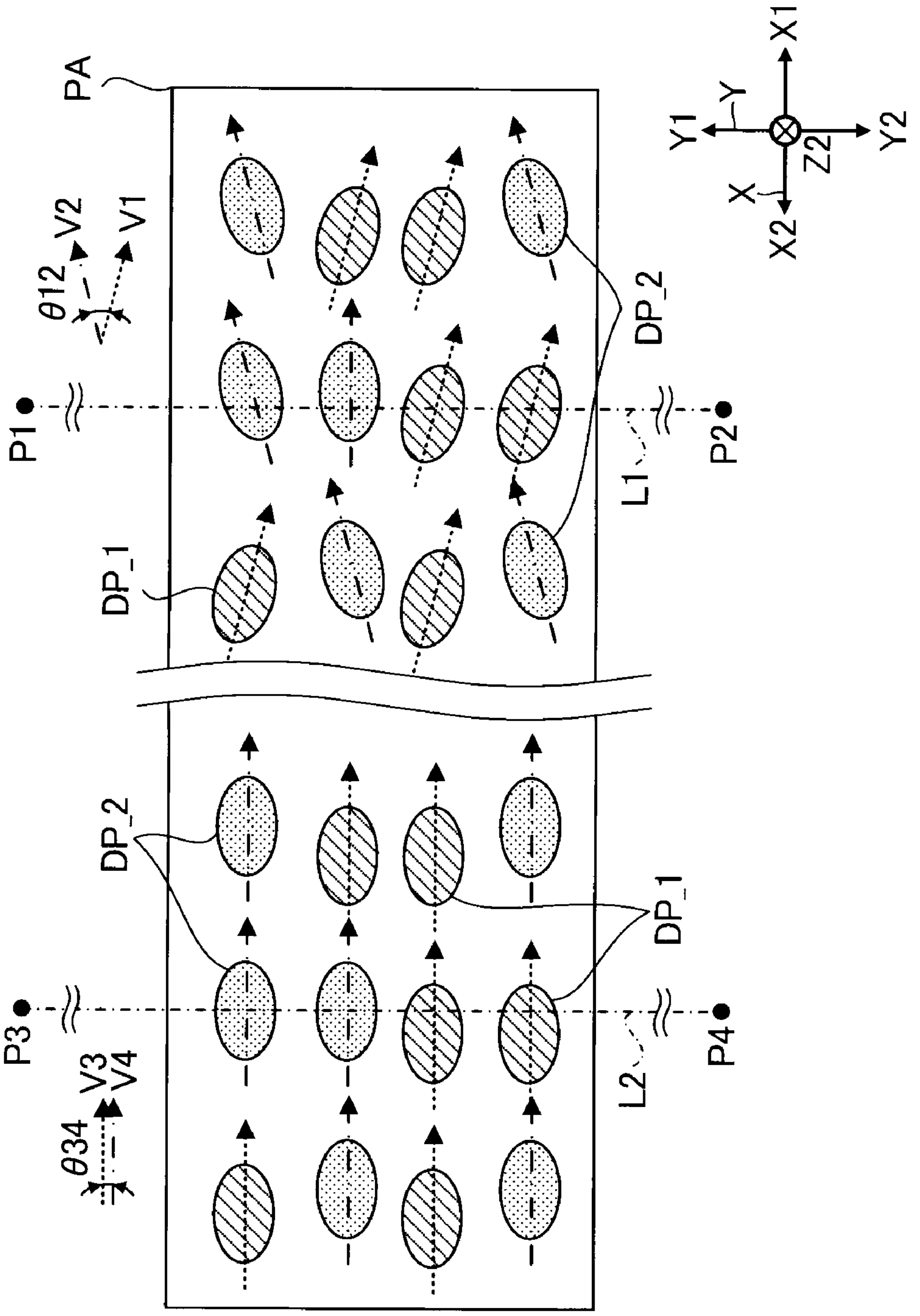
FIG. 8 is an enlarged state of a region in FIG. 6.

FIG. 8 is an enlarged state of a region PA in FIG. 6. The region PA is a region within the overlapping region DR. Further, the first virtual line segment L1 and the second virtual line segment L2 pass through the region PA. FIG. 8 illustrates liquid droplets DP_1 ejected to the band region BR_1 and liquid droplets DP_2 ejected to the band region BR_2. The arrows in the liquid droplet DP_1 and the liquid droplet DP_2 indicate components parallel to a surface of the workpiece W in a flight direction of each liquid droplet.

In the vicinity of the first virtual line segment L1 in the region PA, among flight directions of the liquid droplets DP_1, a component parallel to the surface of the workpiece W is a direction indicated by the vector V1, and among flight directions of the liquid droplet DP_2, a component parallel to the surface of the workpiece W is a direction indicated by the vector V2. An angle formed by the vector V1 and the vector V2 is a first angle θ12. In addition, in the vicinity of the second virtual line segment L2 in the region PA, among flight directions of the liquid droplets DP_1, a component parallel to the surface of the workpiece W is a direction indicated by the vector V3, and among flight directions of the liquid droplet DP_2, a component parallel to the surface of the workpiece W is a direction indicated by the vector V4. An angle formed by the vector V3 and the vector V4 is a second angle θ34. As illustrated in FIG. 8, the first angle θ12 is more than the second angle θ34. Although not illustrated in FIG. 8, an angle formed by the vector V5 and the vector V6 is more than the first angle θ12.

Figure 9:
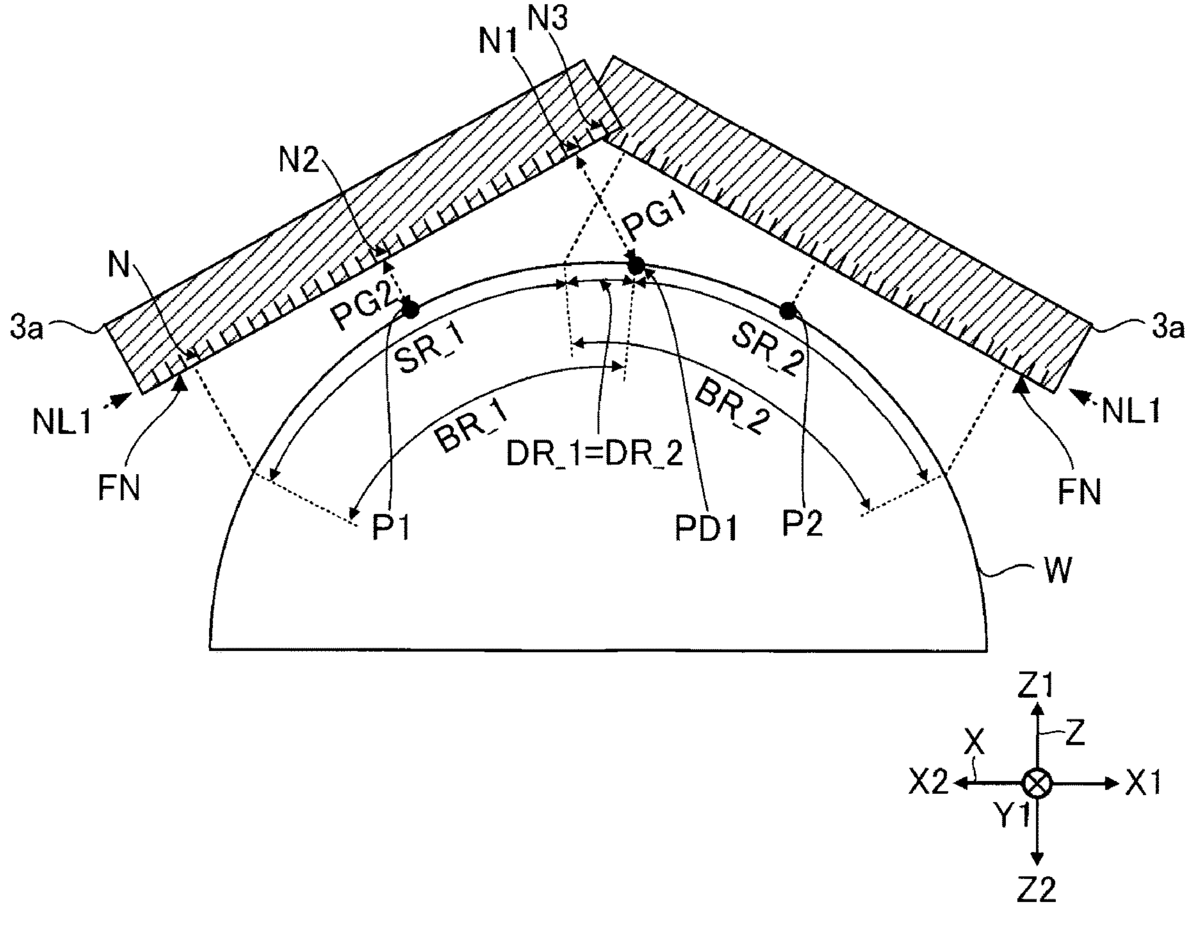
FIG. 9 is a diagram describing a state in which a head is located at a first position and a state in which the head is located at a second position.

FIG. 9 is a diagram describing a state in which the head 3*a* is located at the first position P1 and a state in which the head 3*a* is located at the second position P2. FIG. 9 illustrates a case where the workpiece W is viewed in the Y1 direction. Further, FIG. 9 illustrates a state in which the head 3*a* is located at the first position P1 in the band region BR_1 and a state in which the head 3*a* is located at the second position P2 in the band region BR_2. In order to indicate a positional relationship between the plurality of nozzles N, FIG. 9 illustrates a cross-section when the head 3*a* is cut by a plane passing through the plurality of nozzles N of the first nozzle array NL1. Meanwhile, in order to prevent the drawing from being complicated, the portions other than the plurality of nozzles N are omitted in the cross-section of the head 3*a*.

As can be understood from FIG. 9, a distance between the overlapping region DR and the nozzle N that ejects inks to the overlapping region DR is more than a distance between the non-overlapping region SR and the nozzle N that ejects the inks to the non-overlapping region SR. Hereinafter, a nozzle N1 that ejects the inks in the overlapping region DR_1 and a nozzle N2 that ejects the ink in the non-overlapping region SR_1 when the head 3*a* is located at the first position P1 will be used for description. The nozzle N2 is the nozzle N located at a center of the first nozzle array NL1. The nozzle N3 illustrated in FIG. 9 is the nozzle N located at an end of the first nozzle array NL1. The nozzle N1 is located between the nozzle N2 and the nozzle N3. Since a distance between the nozzle N3 and the printing region Wa exceeds the predetermined range described above, the nozzle N3 does not eject the inks when the head 3*a* is located at the first position P1.

As illustrated in FIG. 9, when the head 3*a* is located at the first position P1, the nozzle N1 ejects the inks into the overlapping region DR_1, and the nozzle N2 ejects the inks into the non-overlapping region SR_1. A position at which the nozzle N1 ejects the inks into the overlapping region DR_1 is a position PD1. In addition, for simplification of the description, it is assumed that a position at which the nozzle N2 ejects the inks into the non-overlapping region SR_1 is the first position P1. When the head 3*a* is located at the first position P1, as illustrated in FIG. 9, a distance PG1 between the position PD1 and the nozzle N1 is more than a distance PG2 between the first position P1 and the nozzle N2. The nozzle N1 is an example of a "first nozzle", and the nozzle N2 is an example of a "second nozzle".

The description will be continued with reference to FIGS. 6 and 7. As illustrated in FIGS. 6 and 7, a region which is a part of the band region BR_1 and in which the head 3*a* at the first position P1 ejects inks and a region which is a part of the band region BR_2 and in which the head 3*a* at the second position P2 ejects the inks form the overlapping region DR to be overlapped with each other having a width of an overlapping width DW1. In the same manner, a region which is a part of the band region BR_1 and in which the head 3*a* at the third position P3 ejects the inks and a region which is a part of the band region BR_2 and in which the head 3*a* at the fourth position P4 ejects the inks form the overlapping region DR to be overlapped with each other having a width of an overlapping width DW3. Here, the overlapping width DW1 is less than the overlapping width DW3 which is a width of the overlapping region DR_1 at the third position P3. In addition, a region which is a part of the band region BR_1 and in which the head 3*a* at the fifth position P5 ejects the inks and a region which is a part of the band region BR_2 and in which the head 3*a* at the sixth position P6 ejects the inks form the overlapping region DR to be overlapped with each other having a width of an overlapping width DW5. The overlapping width DW5 is less than the overlapping width DW1. Meanwhile, the overlapping width DW1 and the overlapping width DW5 are more than 0, as can be understood from FIG. 7. For example, the overlapping width DW5 is preferably two times or more the meandering amount of the head 3*a* in the sub-scanning direction DΦ. In the following description, the width of the overlapping region DR may be collectively referred to as an overlapping width DW. The overlapping width DW1 is an example of a "first overlapping width", the overlapping width DW3 is an example of a "second overlapping width", and the overlapping width DW is a length in a direction along the sub-scanning direction Dθ on the surface of the workpiece W.

Figure 10:
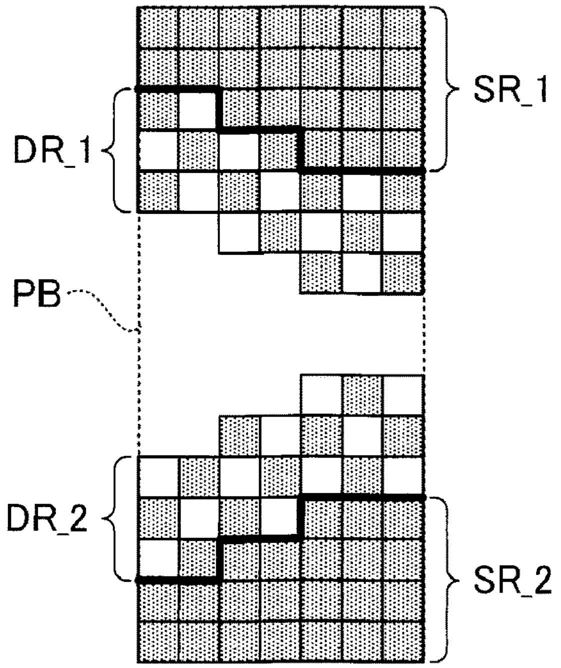
FIG. 10 is a diagram illustrating a relationship between recording pixels of print data in a band region and a band region in the region in FIG. 7.

FIG. 10 is a diagram illustrating a relationship between recording pixels of the print data Img in the band region BR_1 and the band region BR_2 by using the region PB in FIG. 7 as an example. For simplification of the description, FIG. 10 illustrates an example of forming a so-called "solid image", which is a printing image in which liquid droplets are applied to all pixels corresponding to the printing region Wa. In order to form a partial image formed in each band region BR in an printing operation described below, the computer 7 generates the print data Img indicating the partial image corresponding to each of the band regions BR prior to the printing operation. The computer 7 generates the print data Img such that a recording ratio of each of the non-overlapping regions SR is 100%, regarding the non-overlapping regions SR in the two adjacent band regions BR. In addition, in the overlapping regions DR in the two adjacent band regions BR, the computer 7 generates the print data Img such that a total of a recording ratio of the overlapping region DR in one band region BR and a recording ratio of the overlapping region DR in the other band region BR is 100%.

For example, in FIG. 10, the recording pixels are disposed such that each recording ratio of the non-overlapping region SR_1 of the band region BR_1 indicated by shaded pixels and the non-overlapping region SR_2 of the band region BR_2 indicated by shaded pixels in the same manner is 100%. In addition, in FIG. 10, the recording pixels of two regions of the overlapping region DR_1 of the band region BR_1 indicated by shaded pixels and the overlapping region DR_2 of the band region BR_2 indicated by shaded pixels in the same manner are exclusively and intermittently disposed. In other words, the recording pixels, which are pixels at which the liquid droplets are disposed, are appropriately dispersed and disposed such that the recording ratio is 100% in a total of the two. Such a disposition is realized by applying a mask pattern stored in advance in the computer 7 to the printing image. The recording pixel is a pixel corresponding to a position to which liquid droplets are applied in the band region BR, and the recording ratio is a ratio of the recording pixels to all the pixels corresponding to the band region BR.

FIG. 10 illustrates an example in which the computer 7 generates the print data Img such that the recording ratio of the overlapping region DR_1 and the recording ratio of the overlapping region DR_2 are approximately 50% at any position. On the other hand, the recording ratio may be changed in each overlapping region DR. For example, in the overlapping region DR_1, it is possible to set the recording ratio to be increased as the position approaches the non-overlapping region SR_1, and set the recording ratio to be decreased as the position moves away from the non-overlapping region SR_1. In this case, in the overlapping region DR_2, the recording ratio is increased as the position approaches the non-overlapping region SR_2, and the recording ratio is decreased as the position moves away from the non-overlapping region SR_2. That is, a gradation in which the recording ratio in the overlapping region DR is changed stepwise can be used, and the gradation can be superimposed. In this manner, it is possible to prevent a conspicuous difference between the image of the overlapping region DR and the image of the non-overlapping region SR. In addition, in FIG. 10, the disposition of the pixels is illustrated on a plane as a set of squares for easy understanding, and may be disposed three-dimensionally, and include a set of rectangular parallelepipeds, a set of spheres, a set of three-dimensional coordinate information, or the like.

As a method of determining the overlapping width DW, the computer 7 may calculate an inner product of a unit tangent line vector at a position Pa in one of the two adjacent paths RT and a unit tangent line vector at a position Pb in the other path RT to calculate an angle formed by the vector of the position Pa and the vector of the position Pb. Here, the position Pa and the position Pb are examples of two positions that are the same position in the main scanning direction DΦ, and a part of the region in which the head 3*a* at the position Pa can eject inks and a part of the region in which the head 3*a* at the position Pb can eject the inks overlap with each other. The computer 7 or the user determines the overlapping region DR such that the overlapping width DW becomes more as the calculated angle becomes less. In this determination, the user may input any value, a default value stored in advance in the computer 7 may be used, or an appropriate value calculated by the computer 7 according to a shape of the workpiece W may be used such that the overlapping width DW becomes more as the calculated angle becomes less. It is possible to construct an algorithm in which the overlapping width DW is increased in accordance with the decrease in the calculated angle, and such a relationship is represented by any function such as a linear function, for example. Since an appropriate length of the overlapping width DW may be changed depending on the shape of the workpiece W or performance of the head 3*a*, characteristics of the ink, a speed or a weight of a liquid droplet ejected by the head 3*a*, and the like, it is preferable to adjust the length appropriately according to these conditions such that the overlapping width DW becomes more as the calculated angle becomes less.

Figure 11:
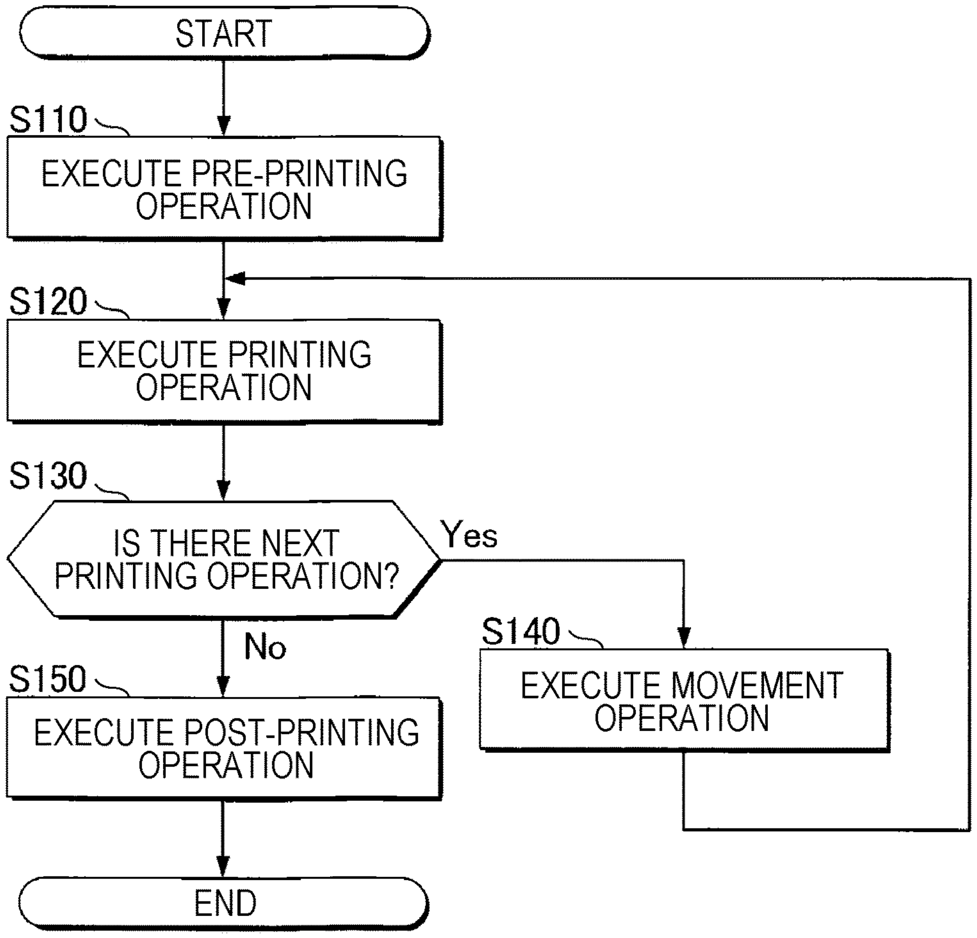
FIG. 11 is a diagram illustrating a flowchart illustrating a flow of a three-dimensional object printing method according to the first embodiment.

1-5. Operation of Three-dimensional Object Printing Apparatus 1 and Three-dimensional Object Printing Method FIG. 11 is a flowchart illustrating a flow of a three-dimensional object printing method according to the first embodiment. The three-dimensional object printing method is performed by using the three-dimensional object printing apparatus 1 described above. A series of operations illustrated in FIG. 11 is executed by the computer 7 controlling the robot 2 and the head unit 3 via the controller 5 and the control module 6.

In step S110, the three-dimensional object printing apparatus 1 executes a pre-printing operation. The pre-printing operation in step S110 is an operation in which the robot 2 changes a relative position of the head **3*a* with respect to the workpiece W before a printing operation. In the pre-printing operation, the head 3*a* does not eject inks. The pre-printing operation includes, for example, a preparation operation such as an operation in which the robot 2 moves the head 3*a* from a position at which a cap (not illustrated) for covering the nozzle surface FN is provided to the start position PS of any one band region BR among the plurality of band regions BR, an operation in which the rotation axis O2, the rotation axis O3, and the rotation axis O5 are in a state to be parallel to each other, and the like. The fact that the rotation axis O2, the rotation axis O3, and the rotation axis O5 are parallel to each other means that the rotation axis O2 and the rotation axis O3 are parallel to each other, the rotation axis O3 and the rotation axis O5 are parallel to each other, and the rotation axis O2 and the rotation axis O5 are parallel to each other. In the pre-printing operation, all of the six joints 230 of the robot 2** can be operated.

After step S110 is ended, the three-dimensional object printing apparatus 1 executes the printing operation in step S120. The printing operation is an operation in which the head **3*a* ejects inks while the robot 2 changes the relative position of the head 3*a* with respect to the workpiece W in the main scanning direction DΦ. Although the number of joints 230 that operate in the printing operation among the plurality of joints 230 is not particularly limited, in the printing operation, the head 3*a* may be moved by operations of a smaller number of joints 230 than in the pre-printing operation. As compared with the pre-printing operation, a deviation of an actual movement path from an ideal movement path of the head 3*a* is reduced by operating the smaller number of joints 230**.

In addition, in order to form a partial image to be formed in each band region BR of the plurality of band regions BR in the printing operation, the computer 7 generates the print data Img indicating the partial image corresponding to each band region BR of the plurality of band regions BR, prior to the printing operation.

After step S120 is ended, the three-dimensional object printing apparatus 1 determines whether or not to execute the next printing operation in step S130. In other words, the three-dimensional object printing apparatus 1 determines whether or not there is a band region BR in which the printing operation is not executed among the plurality of band regions BR.

When the determination result in step S130 is positive, the three-dimensional object printing apparatus 1 executes a movement operation in step S140. The positive determination result in step S130 is a case where the next printing operation is to be executed, and can be said that there is a band region BR in which the printing operation is not executed among the plurality of band regions BR. The movement operation is an operation of moving the head **3*a* to the start position PS of the band region BR corresponding to the next printing operation. In the movement operation, the head 3*a* does not eject the inks. In the movement operation, the robot 2 changes a posture of the head 3*a* while fixing a posture of the workpiece W. After step S140 is ended, the three-dimensional object printing apparatus 1 executes the printing operation in step S120**.

When the determination result in step S130 is negative, the three-dimensional object printing apparatus 1 executes a post-printing operation in step S150. The fact that the determination result in step S130 is negative is a case where the next printing operation is not to be executed, and can be said to be a case where the printing operation is executed for the plurality of band regions BR. The post-printing operation includes, for example, an operation in which the robot 2 moves the head **3*a* from the end position PE of any one of the plurality of band regions BR to another position. The other position is, for example, the position at which the cap described above is provided. In the post-printing operation, all of the six joints 230 of the robot 2 can be operated, and the head 3***a* is moved by operations of a larger number of joints 230 than in the printing operation. After step S150 is ended, the three-dimensional object printing apparatus 1 ends the series of operations illustrated in FIG. 11.

1-6. Summary of First Embodiment

Hereinafter, a summary of the first embodiment will be described by using an example in which in step S120 for the first time, a printing operation on the band region BR_1 is executed, and in the second step S120, the printing operation on the band region BR_2 is executed. In the summary of the first embodiment, the printing operation in step S120 for the first time is an example of the "first printing operation", and the printing operation in step S120 for the second time is an example of the "second printing operation". The printing operation for the first time in step S120 is described as a first-time printing operation, and the printing operation in step S120 for the second time is described as a second-time printing operation.

As described above, the three-dimensional object printing apparatus 1 according to the first embodiment includes the head 3*a* having the plurality of nozzles N that eject inks to the printing region Wa on the workpiece W, and a movement mechanism that changes a relative position and posture between the workpiece W and the head 3*a*. The three-dimensional object printing apparatus 1 executes the first-time printing operation of ejecting the inks from the head 3*a* to the workpiece W while changing the relative position between the workpiece W and the head 3*a* with the path RT_1 along the main scanning direction DΦ_1, and a second-time printing operation of ejecting the inks from the head 3*a* to the workpiece W while changing the relative position between the workpiece W and the head 3*a* by a path RT_2 along the main scanning direction DΦ_2.

Further, in the three-dimensional object printing method according to the first embodiment, step S120 of executing the first-time printing operation of ejecting the inks from the head 3*a* to the workpiece W while changing the relative position between the workpiece W and the head 3*a* with the path RT_1 along the main scanning direction DΦ_1, and step S120 of executing the second-time printing operation of ejecting the inks from the head 3*a* to the workpiece W while changing the relative position between the workpiece W and the head 3*a* with path RT_2 along the main scanning direction DΦ_2 are executed.

The printing region Wa includes the band region BR_1 in which the ink is ejected from the head 3*a* in the printing operation for the first time and the band region BR_2 in which the ink is ejected from the head 3*a* in the printing operation for the second time. When an angle formed by the vector V1 at the first position P1 in the path RT_1 and the vector V2 at the second position P2 in the path RT_2 is set as the first angle θ12, an angle formed by the vector V3 at the third position P3 in the path RT_1 and the vector V4 at the fourth position P4 in the path RT_2 is set as the second angle θ34, a width with which the band region BR_1 overlaps with the band region BR_2 at the first position P1 is set as the overlapping width DW1, and a width with which the region BR_1 overlaps with the band region BR_2 at the third position P3 is set as the overlapping width DW3, the first virtual line segment L1 coupling the first position P1 and the second position P2 along the surface of the workpiece W and second virtual line segment L2 coupling the third position P3 and the fourth position P4 along the surface of the workpiece W do not intersect each other, the first angle θ12 is more than the second angle θ34, and the overlapping width DW1 is less than the overlapping width DW3.

With the first embodiment, it is possible to reduce a region in which an image having a low quality such as uneven liquid droplets occurs, as compared with an aspect in which the overlapping width DW1 is more than the overlapping width DW3.

The width W1 of the band region BR_1 at the first position P1 is less than the width W3 of the band region BR_1 at the third position P3, and the width W2 of the band region BR_2 at the second position P2 is less than the width W2 of the band region BR_2 at the fourth position P4.

As described above, since printing is performed on the printing region Wa, which is a curved surface, a shape of the band region BR is not a rectangular shape. With the first embodiment, a region in which an image having a low quality such as uneven liquid droplets that may occur when printing is performed on the printing region Wa, which is a curved surface, can be reduced.

The first position P1 is closer to an end of the band region BR_1 than the third position P3, and the overlapping width DW1 is more than 0.

As described above, when the head 3*a* is scanned by using a 6-axis vertical articulated robot, the fluctuation of the speed in the main scanning direction DΦ and the meandering in the sub-scanning direction Dθ are large. Therefore, with the first embodiment, since the overlapping width DW1 is more than 0, the overlapping region DR can be provided at the first position P1, and occurrence of white spots can be prevented.

In addition, when among the plurality of nozzles N, the nozzle N that ejects inks to the overlapping region DR_1 in which the band region BR_1 overlaps with the band region BR_2 is set as the nozzle N1 and among the plurality of nozzles N, the nozzle N that ejects the inks to the non-overlapping region SR_1 in which the band region BR_1 does not overlap with the band region BR_2 is set as the nozzle N2, the distance PG1 between the position PD1 at which the ink ejected from the nozzle N1 lands in the band region BR_1 and the nozzle N1 is less than the distance PG2 between a position at which the ink ejected from the nozzle N2 lands in the band region BR_1 and the nozzle N2.

The reason why the distance between the nozzle N of the head 3*a* and the printing region Wa is within a predetermined range is that an air flow occurs since the relative position and posture between the workpiece W and the head 3*a* are changed, and the longer the distance between the nozzle N of the head 3*a* and the print region Wa is, the more the print region is affected by the air flow described above. Therefore, as the distance between the nozzle N and the printing region Wa is increased, the ink ejected from the nozzle N is likely to deviate from the position at which the ink is to land due to the influence of the air flow. As illustrated in FIG. 9, the distance from the nozzle N that ejects the inks to the overlapping regions DR_1 and DR_2 is more than the distance from the nozzle N that ejects the inks to the non-overlapping regions SR_1 and SR_2. Therefore, in addition to the uneven liquid droplets, a deviation of the landing position occurs in the image formed in the overlapping region DR, and thus the quality is lower than the image formed in the non-overlapping region SR. Therefore, in the three-dimensional object printing apparatus 1 according to the present embodiment, by making the overlapping width DW1 at the first position P1 less than the overlapping width DW3, the three-dimensional object printing apparatus 1 can reduce a region in which an image having a low quality occurs, and improve the quality of the image formed in the printing region Wa, as compared with an aspect in which the overlapping width DW1 is more than the overlapping width DW3.

In addition, the third position P3 is a position having the largest width in the band region BR_1.

At the position at which the width is the largest, an angle formed by the vectors of the two adjacent paths RT can be substantially 0 degrees, that is, directions of the respective vectors can be made substantially parallel. By setting the directions of the respective vectors to be substantially parallel to each other, it is possible to prevent occurrence of uneven liquid droplets applied onto the workpiece W.

Further, a surface forming the printing region Wa is made of a material that does not absorb the inks ejected from each of the plurality of nozzles N.

When the nozzle surface FN and the surface forming the printing region Wa are not parallel and have an inclination, the landing position may deviate from the original landing position due to the deviation in a direction in which the ink lands on the printing region Wa, and the quality of the image may deteriorate. In particular, when the printing region Wa is configured with a material that does not absorb inks, a part of the liquid droplet moves due to the deviation in the direction in which the ink lands, and the quality of the image significantly deteriorates. Therefore, the three-dimensional object printing apparatus 1 according to the present embodiment can reduce the occurrence of the deviation in the landing direction by making the overlapping width DW1 less than the overlapping width DW3, and thus the quality of the image formed in the printing region Wa can be maintained even when the printing region Wa is made of a material that does not absorb inks.

In addition, the ink ejected from each of the plurality of nozzles N is an ultraviolet curable ink.

The ultraviolet curable ink is not absorbed by the workpiece W. In particular, in a case of low-density printing, the ink ejected from one nozzle N among the plurality of nozzles N adheres in the printing region Wa in a state of an isolated dot without being combined with an ink ejected from other nozzles. Therefore, in the aspect in which the ultraviolet curable ink is used, the deviation in the direction in which the ink lands is more likely to affect the image quality, as compared with an aspect in which the ink absorbed inside the workpiece W is used. Since the three-dimensional object printing apparatus 1 according to the present embodiment can reduce the occurrence of the deviation in the direction in which the ink lands by making the overlapping width DW1 less than the overlapping width DW3, the quality of the image formed in the printing region Wa can be maintained even when the ultraviolet curable ink is used.

2. Second Embodiment

In the first embodiment, the overlapping region DR exists from one end to the multiple ends of the X-axis of the band region BR. Meanwhile, the overlapping region DR may not exist at an end portion of the band region BR in the X1 direction and an end portion of the band region BR in the X2 direction. A second embodiment will be described below.

Figure 12:
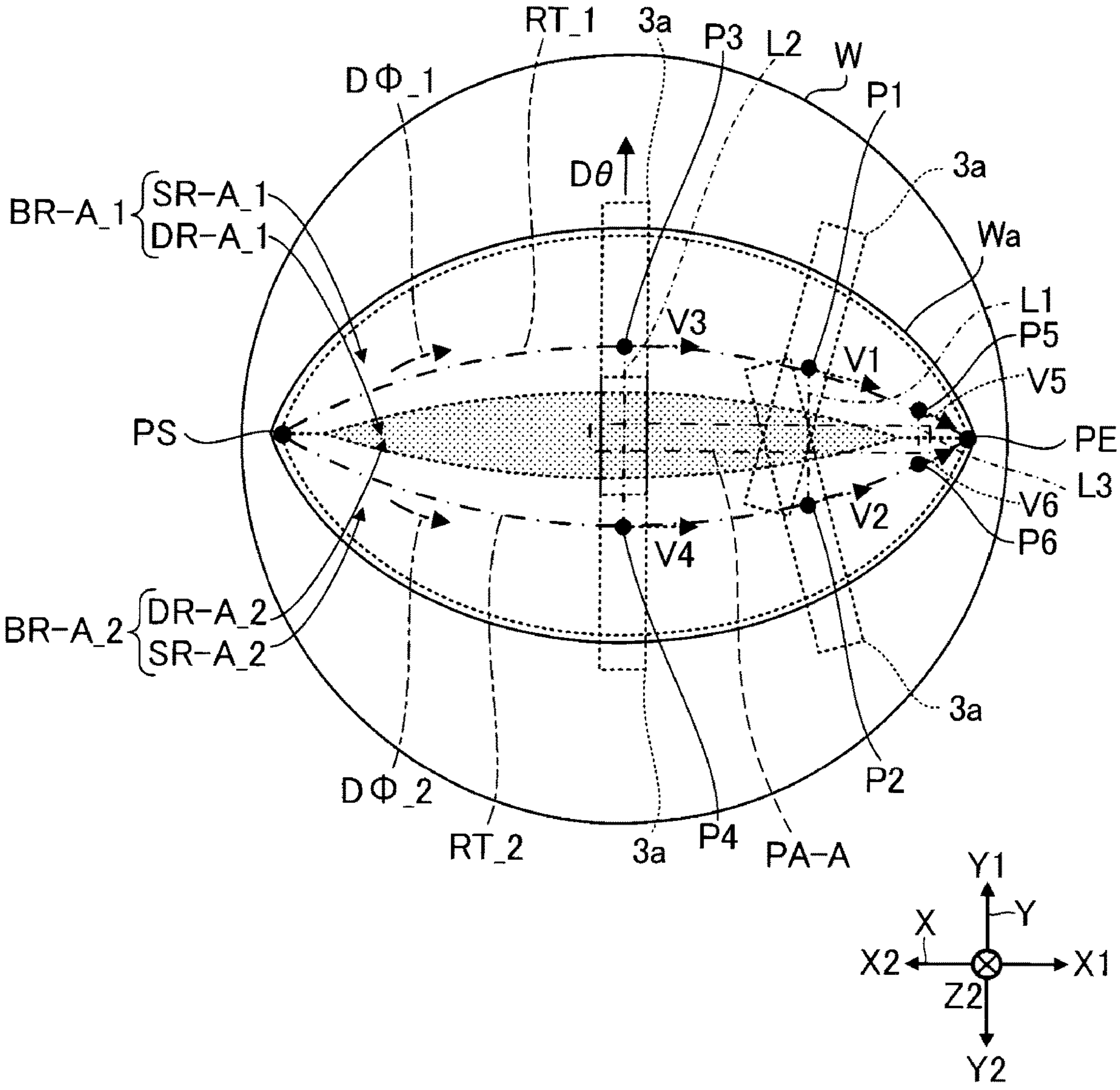
FIG. 12 is a diagram describing a band region according to a second embodiment.
Figure 13:
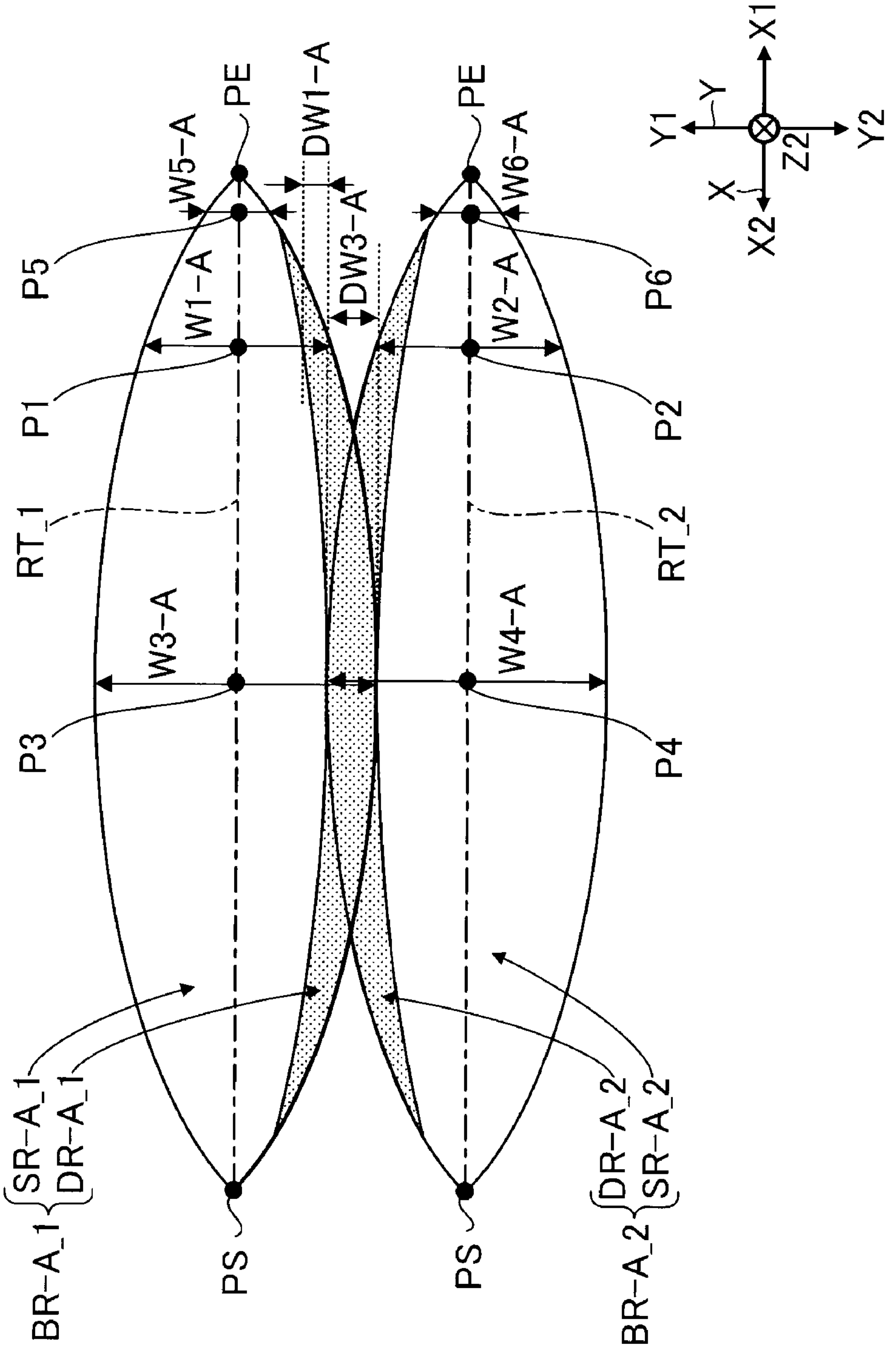
FIG. 13 is a diagram describing the band region according to the second embodiment.

FIGS. 12 and 13 are diagrams describing a band region BR-A according to the second embodiment. FIG. 12 illustrates a plan view of the workpiece W viewed in the Z2 direction, and in FIG. 13, a plurality of band regions BR-A are expanded in the XY plane for easy understanding. In FIG. 13, as a display for convenience, the band region BR-A is displayed slightly smaller such that a contour of the band region BR does not overlap with a contour of the printing region Wa.

In the second embodiment, the printing region Wa includes a band region BR-A_1 and a band region BR-A_2.

The band region BR-A_1 has a non-overlapping region SR-A_1 and an overlapping region DR-A_1 that overlaps with the band region BR-A_2. The band region BR-A_2 has a non-overlapping region SR-A_2 and an overlapping region DR-A_2 that overlaps with the band region BR-A_1. In the following description, each of the non-overlapping region SR-A_1 and the non-overlapping region SR-A_2 may be described as a non-overlapping region SR-A without distinguishing the non-overlapping region SR-A_1 and the non-overlapping region SR-A_2. In addition, without distinguishing each of the overlapping region DR-A_1 and the overlapping region DR-A_2, the overlapping region DR-A_1 and the overlapping region DR-A_2 may be described as an overlapping region DR-A.

The overlapping region DR-A is narrower than the overlapping region DR in the first embodiment. Since the overlapping region DR-A has a shape different from the shape of the overlapping region DR, the band region BR-A also has a shape different from the shape of the band region BR. In the second embodiment, among a width W3-A of the band region BR-A_1 at the third position P3, a width W1-A of the band region BR-A_1 at the first position P1, and a width W5-A of the band region BR-A_1 at the fifth position P5, the width W3-A is the largest, the width W1-A is the next largest, and the width W5-A is the smallest. In addition, among a width W4-A of the band region BR-A_2 at the fourth position P4, a width W2-A of the band region BR-A_2 at the second position P2, and a width W6-A of the band region BR-A_2 at the sixth position P6, the width W4-A is the largest, the width W2-A is the next largest, and the width W6-A is the smallest. In FIG. 13, in order to make it easier to understand the lengths of the width W4-A and the width W3-A, as a display for convenience, the positions of the third position P3 and the fourth position P4 on the X-axis are slightly shifted and displayed.

As illustrated in FIG. 13, an overlapping width DW1-A which is a width of the overlapping region DR-A_1 at the first position P1 is less than an overlapping width DW3-A which is a width of the overlapping region DR-A_1 at the third position P3. As illustrated in FIGS. 12 and 13, the overlapping region DR does not exist at an end portion of the band region BR-A in the X1 direction and an end portion of the band region BR-A in the X2 direction. Specifically, an overlapping width, which is a width of the overlapping region DR-A_1 at the fifth position P5, is 0. That is, at the fifth position P5, the band region BR_1 does not overlap with the band region BR_2.

Figure 14:
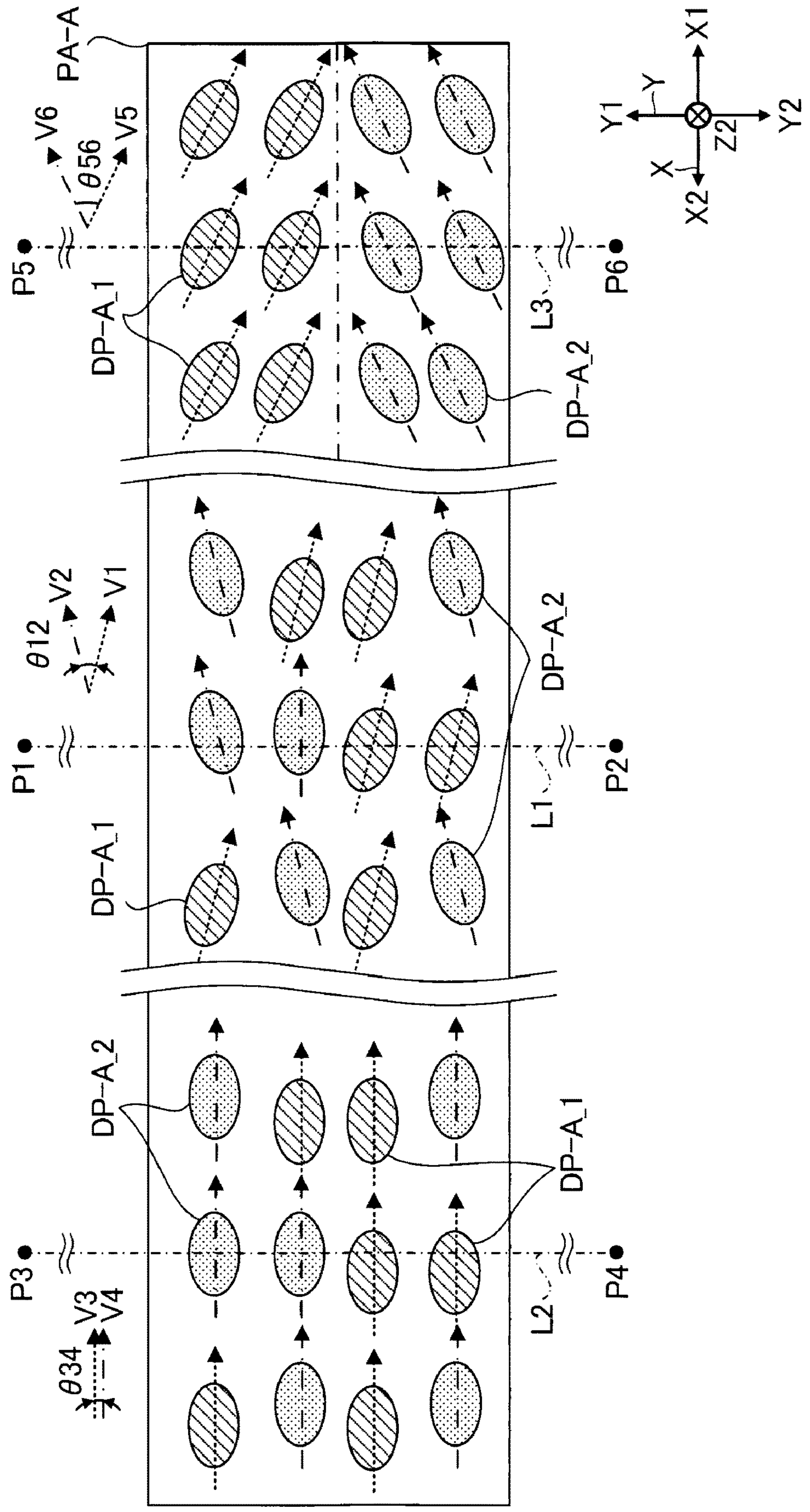
FIG. 14 is an enlarged state of a region in FIG. 12.

FIG. 14 is an enlarged state of a region PA-A in FIG. 12. The region PA-A is a region over the overlapping region DR-A and the non-overlapping region SR-A. Further, the first virtual line segment L1, the second virtual line segment L2, and the third virtual line segment L3 pass through the region PA-A. FIG. 14 illustrates liquid droplets DP-A_1 ejected to the band region BR-A_1 and liquid droplets DP-A_2 ejected to the band region BR-A_2. Hereinafter, without distinguishing each of the liquid droplet DP-A_1 and the liquid droplet DP-A_2, the liquid droplet DP-A_1 and the liquid droplet DP-A_2 may be described as a liquid droplet DP-A.

Ejection directions of the liquid droplets DP-A in the vicinity of the first virtual line segment L1 and in the vicinity of the second virtual line segment L2 in the region PA are the same as in FIG. 8 of the first embodiment, and thus the description thereof will be omitted. In the vicinity of the third virtual line segment L3 in the region PA, the ejection direction of the liquid droplet DP-A_1 is a direction indicated by the vector V5, and the ejection direction of the liquid droplet DP-A_2 is a direction indicated by the vector V6. An angle formed by the vector V5 and the vector V6 is a third angle θ56. The third angle θ56 is more than the first angle θ12.

As described above, in the second embodiment, when the angle formed by the vector V5 at the fifth position P5 in the path RT_1 and the vector V6 at the sixth position P6 in the path RT_2 is set as the third angle θ56, the third virtual line segment L3 coupling the fifth position P5 and the sixth position P6 along a surface of the workpiece W does not intersect with the first virtual line segment L1 and the second virtual line segment L2, the third angle θ56 is more than the first angle θ12, and the band region BR-A_1 and the band region BR-A_2 do not overlap with each other at the fifth position P5. The first virtual line segment L1 is located between the second virtual line segment L2 and the third virtual line segment L3.

A magnitude of the angle formed by the vectors in the two adjacent paths RT is large at the end portion of the band region BR-A. Therefore, in the second embodiment, the overlapping region DR-A is not provided at the fifth position P5, which is the end portion of the band region BR-A, so that an image having a low quality such as uneven liquid droplets can be prevented from being formed.

In addition, as illustrated in FIG. 13, the width W1-A of the band region BR-A_1 at the first position P1 is less than the width W3-A of the band region BR-A_1 at the third position P3, and is more than the width W5-A of the band region BR-A_1 at the fifth position P5, the width W2-A of the band region BR-A_2 at the second position P2 is less than the width W4-A of the band region BR-A_2 at the fourth position P4, and is more than the width W6-A of the band region BR-A_2 at the sixth position P6.

3. Modification Example

Each form exemplified above can be variously modified. A specific aspect of the modification is illustrated below. Any two or more aspects selected from the following examples can be combined as appropriate as long as there is no contradiction.

3-1. First Modification Example

In the printing operation in step S130 in each of the aspects described above, the position of the head 3*a* is moved once from the start position PS to the end position PE with respect to one band region BR. Meanwhile, the present disclosure is not limited thereto. For example, the position of the head 3*a* may be moved a plurality of times along the path RT with respect to one band region BR, and the head 3*a* may eject inks in each of the plurality of movements. In each of the plurality of movements, the computer 7 generates the print data Img indicating a partial image corresponding to each of the plurality of movements. For example, when n times of movement are executed with respect to one band region BR, the computer 7 generates the print data Img such that the recording ratio is 1/n in one movement.

3-2. Second Modification Example

The printing region Wa of the workpiece W in each of the aspects described above is a projecting curved surface. Meanwhile, the present disclosure is not limited thereto. Another example of the surface of the workpiece W will be described as a second modification example.

Figure 15:
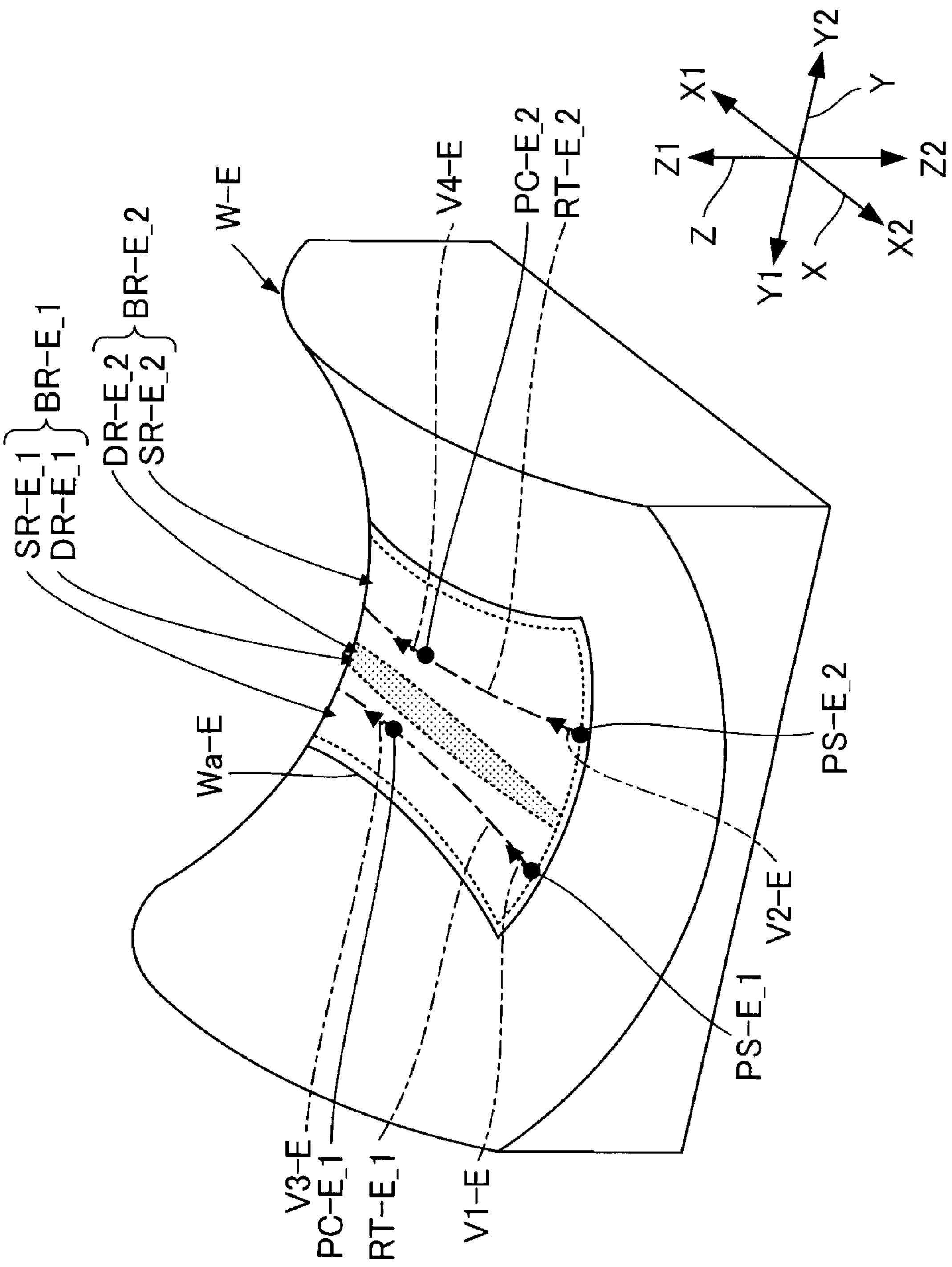
FIG. 15 is a perspective view of a workpiece according to a second modification example.
Figure 16:
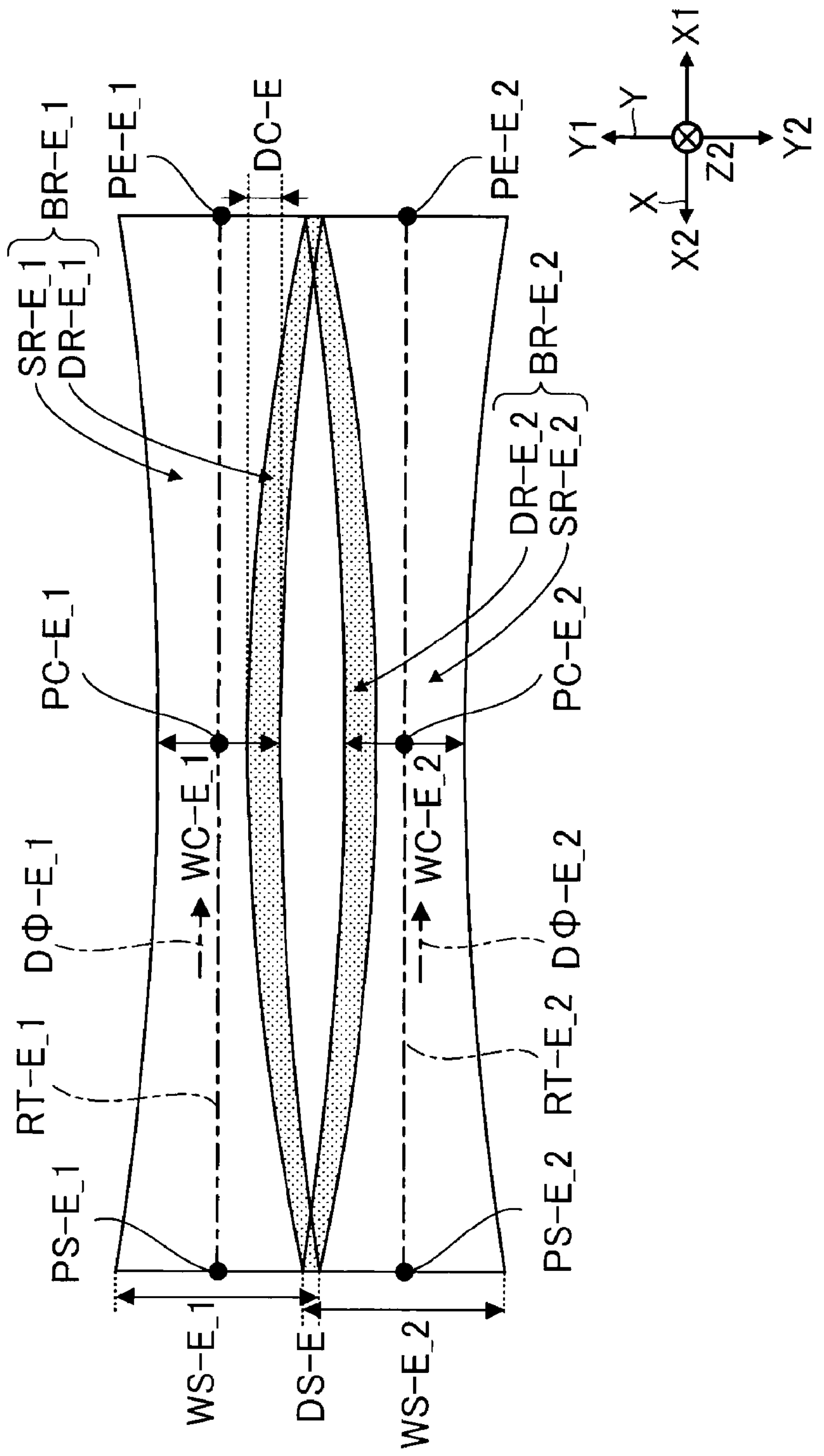
FIG. 16 is a diagram illustrating an example of a band region according to the second modification example.

FIG. 15 is a perspective view of a workpiece W-E according to the second modification example. FIG. 16 is a diagram illustrating an example of a band region BR-E according to the second modification example. The workpiece W-E has a shape that imitates a saddle type of a horse. Specifically, the workpiece W-E is curved to project over the X2 direction to the X1 direction in the Z1 direction, and is curved to project over the Y1 direction to the Y2 direction in the Z2 direction. For simplification of the description, it is assumed that the workpiece W-E has a rectangular shape when viewed in the Z2 direction. In FIG. 15, as a display for convenience, the band region BR-E is displayed slightly smaller such that a contour of the band region BR-E according to the second modification example does not overlap with a contour of a printing region Wa-E. In FIG. 16, for easy understanding, a plurality of band regions BR-E are expanded in the XY plane.

The printing region Wa-E includes a band region BR-E_1 and a band region BR-E_2. Hereinafter, each of the band region BR-E_1 and the band region BR-E_2 may be collectively referred to as a band region BR without distinguishing the band region BR-E_1 and the band region BR-E_2.

As illustrated in FIGS. 15 and 16, a partial image is formed in the band region BR-E_1 by ejecting inks from the head 3*a* while the head 3*a* is moved along a path RT-E_1 along the main scanning direction DΦ_1. In addition, a partial image is formed in the band region BR-E_2 by ejecting the inks from the head 3*a* while the head 3*a* is moved along a path RT-E_2 along the main scanning direction DΦ_2.

The path RT-E_1 is a path from a start position PS-E_1 to an end position PE-E_1 along the surface of the workpiece W-E. The path RT-E_2 is a path from a start position PS-E_2 to the end position PE-E_2 along the surface of the workpiece W-E. A main scanning direction DΦ-E_1 is a longitudinal direction of the band region BR-E_1 and is a direction along the path RT-E_1, and the direction is constantly changed. A main scanning direction DΦ-E_2 is the longitudinal direction of the band region BR-E_2 and is a direction along the path RT-E_2, and the direction is constantly changed.

Regarding the specific shape of the band region BR-E, a width at a center of the band region BR-E on the X-axis is the smallest, and the width of the band region BR-E becomes larger toward the X2 direction or the X1 direction. Specifically, a width WC-E_1 at a position PC-E_1 which is a center of the band region BR-E_1 on the X-axis is less than a width WS-E_1 of the band region BR-E_1 at the start position PS-E_1. In the same manner, a width WC-E_2 at a position PC-E_2 which is a center of the band region BR-E_2 on the X-axis is less than a width WS-E_2 of the band region BR-E_2 at the start position PS-E_2.

In the example in FIG. 15, a vector V3-E of the position PC-E_1 in the path RT-E_1 and a vector V4-E of the position PC-E_2 in the path RT-E_2 are substantially parallel to each other. On the other hand, a vector V1-E of the start position PS-E_1 in the path RT-E_1 and a vector V2-E of the start position PS-E_2 in the path RT-E_2 are not parallel to each other. Therefore, an angle formed by the vector V1-E and the vector V2-E is more than an angle formed by the vector V3-E and the vector V4-E. Therefore, as illustrated in FIG. 16, a width DS-E of an overlapping region DR-E_1 at the start position PS-E_1 is less than a width DC-E of the overlapping region DR-E_1 at the position PC-E_1.

In the second modification example, the start position PS-E_1 is an example of the "first position", the start position PS-E_2 is an example of the "second position", the position PC-E_1 is an example of the "third position", and the position PC-E_2 is an example of the "fourth position". The width DS-E is an example of the "first overlapping width", and the width DC-E is an example of the "second overlapping width".

3-3. Third Modification Example

In each of the aspects described above, the surface forming the printing region Wa is configured with a material that does not absorb the ink ejected from each of the plurality of nozzles N. Meanwhile, the present disclosure is not limited thereto. For example, the surface forming the printing region Wa may be made of a material that is less likely to absorb the ink, as compared with a printing paper such as paper.

3-4. Fourth Modification Example

In each of the embodiments described above, the configuration using the 6-axis vertical multi-axis robot as the robot is described. Meanwhile, the configuration is not limited to this configuration. The robot 2 may be, for example, a vertical multi-axis robot other than the 6-axis robot, or a horizontal multi-axis robot. Further, the arm portion 220 of the robot 2 may have a telescopic mechanism, a linear motion mechanism, or the like in addition to the joint configured with the rotation mechanism. Meanwhile, from the viewpoint of the balance between the print quality in the printing operation and the degree of freedom of the robot 2 operation in the non-printing operation such as the pre-printing operation, the movement operation, and the post-printing operation, the robot 2 may be a multi-axis robot having 6 axes or more.

3-5. Fifth Modification Example

In each of the embodiments described above, the configuration using screwing or the like as a method of fixing the head 3*a* to the robot 2 is described, and the configuration is not limited to this configuration. For example, the head 3*a* may be fixed to the robot 2 by gripping the head 3*a* with a gripping mechanism such as a hand mounted as an end effector of the robot 2.

3-6. Sixth Modification Example

In each of the embodiments described above, the configuration in which printing is performed by using one type of ink is described. Meanwhile, the configuration is not limited to this configuration, and the present disclosure can be applied to a configuration in which printing is performed by using two or more types of ink.

3-7. Seventh Modification Example

The use of the three-dimensional object printing apparatus of the present disclosure is not limited to image printing. For example, a three-dimensional object printing apparatus that ejects a solution of a conductive material is used as a manufacturing apparatus of forming wirings or electrodes on a wiring substrate. In addition, the three-dimensional object printing apparatus can also be used as a jet dispenser of applying a liquid such as an adhesive to a medium.

3-8. Eighth Modification Example

In each of the embodiments described above, the configuration in which the head 3*a* is supported by the robot 2 and moved is described. Meanwhile, the configuration is not limited to this configuration. For example, the head 3*a* may be fixed to a base or the like, and the workpiece W may be supported by the robot 2 and moved.

What is claimed is:

1. A three-dimensional object printing apparatus comprising:

a head having a plurality of nozzles that eject a liquid to a printing region on a workpiece;

a movement mechanism that changes a relative position and posture between the workpiece and the head; and a control portion that controls the head and the movement mechanism, wherein the control portion executes a first printing operation of ejecting the liquid from the head to the workpiece while changing the relative position between the workpiece and the head through a first path, and a second printing operation of ejecting the liquid from the head to the workpiece while changing the relative position between the workpiece and the head through a second path, the printing region includes a first band region into which the liquid is ejected from the head in the first printing operation, and a second band region into which the liquid is ejected from the head in the second printing operation, and when a width of a region in which a region of the first band region into which the liquid is ejected from the head at a first position in the first path and a region of the second band region into which the liquid is ejected from the head at a second position in the second path overlap with each other is set as a first overlapping width, a width of a region in which a region of the first band region into which the liquid is ejected from the head at a third position in the first path and a region of the second band region into which the liquid is ejected from the head at a fourth position in the second path overlap with each other is set as a second overlapping width, an angle formed by a vector representing a relative movement between the workpiece and the head at the first position and a vector representing the relative movement between the workpiece and the head at the second position is set as a first angle, and an angle formed by a vector representing the relative movement between the workpiece and the head at the third position and a vector representing the relative movement between the workpiece and the head at the fourth position is set as a second angle, the first angle is more than the second angle, and the first overlapping width is less than the second overlapping width.

2. The three-dimensional object printing apparatus according to claim 1, wherein a width of the first band region at the first position is less than a width of the first band region at the third position, and a width of the second band region at the second position is less than a width of the second band region at the fourth position.

3. The three-dimensional object printing apparatus according to claim 2, wherein the first position is closer to an end of the first band region than is the third position, and the first overlapping width is more than 0.

4. The three-dimensional object printing apparatus according to claim 1, wherein when a nozzle that ejects the liquid to a region in which the first band region overlaps with the second band region at the first position is set as a first nozzle, and among a nozzle that ejects the liquid to a region in which the first band region does not overlap with the second band region at the first position is set as a second nozzle, a distance between a position at which the liquid ejected from the first nozzle lands in the first band region and the first nozzle is more than a distance between a position at which the liquid ejected from the second nozzle lands in the first band region and the second nozzle.

5. The three-dimensional object printing apparatus according to claim 2, wherein the third position is a position having a largest width in the first band region.

6. The three-dimensional object printing apparatus according to claim 1, wherein when a position away from the first position in the first path is set as a fifth position, a position away from the second position in the second path is set as a sixth position, a distance from the first position to the fifth position along the first path is set to be equal to a distance from the second position to the sixth position along the second path, and an angle formed by a vector representing a relative movement between the workpiece and the head at the fifth position and a vector representing a relative movement between the workpiece and the head at the sixth position is set as a third angle, the third angle is more than the first angle, and the first band region and the second band region do not overlap with each other at the fifth position.

7. The three-dimensional object printing apparatus according to claim 6, wherein a first virtual line segment coupling the first position and the second position along a surface of the workpiece is located between a second virtual line segment coupling the third position and the fourth position along the surface of the workpiece and a third virtual line segment coupling the fifth position and the sixth position along the surface of the workpiece.

8. The three-dimensional object printing apparatus according to claim 6, wherein a width of the first band region at the first position is less than a width of the first band region at the third position, and more than a width of the first band region at the fifth position, and a width of the second band region at the second position is less than a width of the second band region at the fourth position, and more than a width of the second band region at the sixth position.

9. The three-dimensional object printing apparatus according to claim 1, wherein a surface forming the printing region is made of a material that does not absorb the liquid.

10. The three-dimensional object printing apparatus according to claim 1, wherein the liquid ejected from the head is an ultraviolet curable ink.

11. A three-dimensional object printing method for a three-dimensional object printing apparatus including a head having a plurality of nozzles that eject a liquid to a printing region on a workpiece, and a movement mechanism that changes a relative position and posture between the workpiece and the head, the method comprising:

a first printing operation of ejecting the liquid from the head to the workpiece while changing the relative position between the workpiece and the head through a first path; and a second printing operation of ejecting the liquid from the head to the workpiece while changing the relative position between the workpiece and the head through a second path, wherein the printing region includes a first band region into which the liquid is ejected from the head in the first printing operation, and a second band region into which the liquid is ejected from the head in the second printing operation, and when a width of a region in which a region of the first band region into which the liquid is ejected from the head at a first position in the first path and a region of the second band region into which the liquid is ejected from the head at a second position in the second path overlap with each other is set as a first overlapping width, a width of a region in which a region of the first band region into which the liquid is ejected from the head at a third position in the first path and a region of the second band region into which the liquid is ejected from the head at a fourth position in the second path overlap with each other is set as a second overlapping width, an angle formed by a vector representing a relative movement between the workpiece and the head at the first position and a vector representing the relative movement between the workpiece and the head at the second position is set as a first angle, and an angle formed by a vector representing the relative movement between the workpiece and the head at the third position and a vector representing the relative movement between the workpiece and the head at the fourth position is set as a second angle, the first angle is more than the second angle, and the first overlapping width is less than the second overlapping width.

12. A three-dimensional object printing apparatus comprising:

a head having a plurality of nozzles that ejects a liquid to a printing region on a workpiece;

a movement mechanism that changes a relative position and posture between the workpiece and the head; and a control portion that controls the head and the movement mechanism, wherein the control portion executes a first printing operation in which the head ejects the liquid into a first band region while the movement mechanism changes the relative position between the workpiece and the head through a first path, and a second printing operation in which the head ejects the liquid into a second band region while the movement mechanism changes the relative position between the workpiece and the head through a second path, when a width of a region in which a region of the first band region at a first position and a region of the second band region at a second position overlap with each other is set as a first overlapping width, a width of a region in which a region of the first band region at a third position and a region of the second band region at a fourth position overlap with each other is set as a second overlapping width, an angle formed by a vector representing a relative movement between the workpiece and the head at the first position and a vector representing the relative movement between the workpiece and the head at the second position is set as a first angle, and an angle formed by a vector representing the relative movement between the workpiece and the head at the third position and a vector representing the relative movement between the workpiece and the head at the fourth position is set as a second angle, the first angle is more than the second angle, and the first overlapping width is less than the second overlapping width.

* * * * *